(12) United States Patent
Duan et al.

(10) Patent No.: US 12,199,862 B2
(45) Date of Patent: Jan. 14, 2025

(54) BIERv6 PACKET PROCESSING METHOD, DEVICE, AND SYSTEM

(71) Applicant: HUAWEI TECHNOLOGIES CO., LTD., Guangdong (CN)

(72) Inventors: Fanghong Duan, Nanjing (CN); Jingrong Xie, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/476,354

(22) Filed: Sep. 28, 2023

(65) Prior Publication Data

US 2024/0022508 A1 Jan. 18, 2024

Related U.S. Application Data

(63) Continuation of application No. PCT/CN2022/081468, filed on Mar. 17, 2022.

(30) Foreign Application Priority Data

Mar. 29, 2021 (CN) .......................... 202110332339.1

(51) Int. Cl.
| | |
|---|---|
| *G06F 15/173* | (2006.01) |
| *H04L 45/00* | (2022.01) |
| *H04L 45/02* | (2022.01) |
| *H04L 45/748* | (2022.01) |

(52) U.S. Cl.
CPC ............ *H04L 45/566* (2013.01); *H04L 45/02* (2013.01); *H04L 45/748* (2013.01)

(58) Field of Classification Search
None
See application file for complete search history.

(56) References Cited

U.S. PATENT DOCUMENTS

2019/0394059 A1* 12/2019 Zhang .................... H04L 45/16

* cited by examiner

*Primary Examiner* — Wing F Chan
*Assistant Examiner* — Andrew Woo

(57) ABSTRACT

The present disclosure provides a bit index explicit replication over internet protocol version 6 (BIERv6) packet processing method, and the method is applied to an Ethernet virtual private network (EVPN). The method includes: A first network device receives a BIERv6 packet sent by a second network device. The BIERv6 packet includes an internet protocol version 6 (IPv6) header and a broadcast, unknown unicast, and multicast (BUM) packet, a source address (SA) of the IPv6 header is a IPv6 address, the IPv6 address identifies the second network device, the first network device is an egress device in a BIER domain, and the second network device is an ingress device in the BIER domain. The first network device determines, based on the IPv6 address, a EVPN instance to which the BUM packet belongs. The first network device forwards the BUM packet based on the EVPN instance. The foregoing technical solutions can reduce waste of public network link bandwidth, and improve BUM packet replication efficiency.

18 Claims, 8 Drawing Sheets

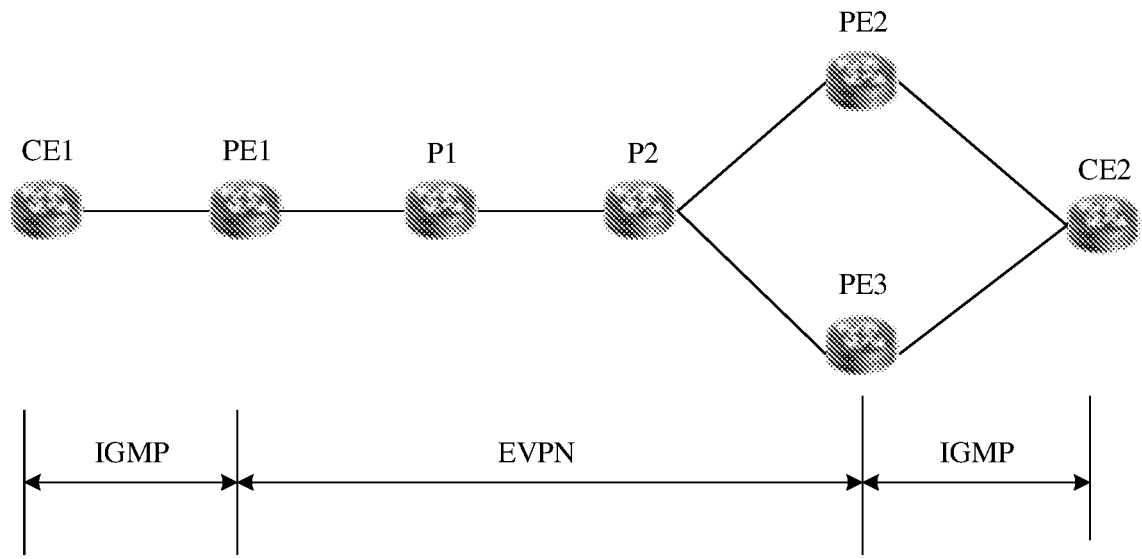

FIG. 1

A first network device receives a BIERv6 packet sent by a second network device, where the BIERv6 packet includes an IPv6 header and a BUM packet, and a source address SA of the IPv6 header is a first IPv6 address — 210

The first network device determines, based on the first IPv6 address, a first EVPN instance to which the BUM packet belongs — 220

The first network device forwards the BUM packet based on the first EVPN instance — 230

FIG. 2

MSID IPv6 address

BIERv6 PACKET PROCESSING METHOD, DEVICE, AND SYSTEM

CROSS-REFERENCE TO RELATED APPLICATIONS

This application is a continuation of International Application No. PCT/CN2022/081468, filed on Mar. 17, 2022, which claims priority to Chinese Patent Application No. 202110332339.1, filed on Mar. 29, 2021. The disclosures of the aforementioned applications are hereby incorporated by reference in their entireties.

TECHNICAL FIELD

The present disclosure relates to the field of network communication, and more specifically, to a BIERv6 packet processing method, a first network device, a second network device, and a system.

BACKGROUND

Multicast is a data transmission mode in which data is efficiently sent to a plurality of receivers in a transmission control protocol (TCP)/internet protocol (IP) network at the same time by using one multicast address.

In a related technical solution, an ingress replication (IR) tunnel is introduced into an Ethernet virtual private network (EVPN). The IR tunnel is used to carry a broadcast, unknown unicast, and multicast (BUM) data flow in the EVPN. In addition, at an ingress (for example, an ingress device in the EVPN), a BUM packet is replicated to all virtual extensible local area network tunnel endpoints (VTEPs) belonging to a same virtual extensible local area network identifier (VNI). In this case, when a quantity of devices in the EVPN is large, public network link bandwidth consumption is high, a large amount of bandwidth is wasted, and BUM packet replication efficiency is low.

SUMMARY

The present disclosure provides a BIERv6 packet processing method, device, and system, to reduce waste of public network link bandwidth, and improve BUM packet replication efficiency.

According to a first aspect, a BIERv6 packet processing method is provided. The method is applied to an Ethernet virtual private network (EVPN) and includes: A first network device receives a BIERv6 packet sent by a second network device. The BIERv6 packet includes an IPv6 header and a BUM packet, a source address (SA) of the IPv6 header is a first IPv6 address, the first IPv6 address identifies the second network device, the first network device is an egress device in a BIER domain, and the second network device is an ingress device in the BIER domain. The first network device determines, based on the first IPv6 address, a first EVPN instance to which the BUM packet belongs. The first network device forwards the BUM packet based on the first EVPN instance.

In the foregoing technical solutions, a bit index explicit replication over internet protocol version 6 (BIERv6) tunnel is introduced into the EVPN. The BIERv6 tunnel is used to carry a BUM packet in the EVPN. The BUM packet may be replicated on demand based on a bit string in a BIER header, to reduce the waste of public network link bandwidth and improve the BUM packet replication efficiency.

With reference to the first aspect, in some implementations of the first aspect, the first IPv6 address includes a first identifier. The first identifier identifies, on the second network device, an EVPN instance to which the BUM packet belongs as the first EVPN instance.

With reference to the first aspect, in some implementations of the first aspect, the first network device determines the first EVPN instance based on a prefix of the first IPv6 address, the first identifier, and a first correspondence. The first correspondence is a correspondence between the prefix of the first IPv6 address, the first identifier, and the first EVPN instance.

With reference to the first aspect, in some implementations of the first aspect, before that a first network device receives a BIERv6 packet sent by a second network device, the method further includes: The first network device receives a first EVPN route sent by the second network device, and the first EVPN route carries the prefix of the first IPv6 address and the first identifier. The first network device establishes the first correspondence based on the first EVPN route.

With reference to the first aspect, in some implementations of the first aspect, the first EVPN route is an inclusive multicast Ethernet tag (IMET) route. The prefix of the first IPv6 address and the first identifier are carried in a multicast service identifier (MSID) attribute field or a prefix segment identifier prefix (SID) attribute field of the IMET route.

With reference to the first aspect, in some implementations of the first aspect, the first IPv6 address further includes a second identifier. The second identifier is an identifier allocated by the first network device to a first Ethernet segment (ES), and the first ES is a dual-homed ES of the first network device and the second network device.

With reference to the first aspect, in some implementations of the first aspect, the method further includes: The first network device determines a first interface based on the prefix of the first IPv6 address, the second identifier, and a second correspondence. The second correspondence is a correspondence between the prefix of the first IPv6 address, the second identifier, and the first interface, and the first interface is an interface corresponding to the first ES on the first network device. That the first network device forwards the BUM packet based on the first EVPN instance includes: The first network device forwards the BUM packet to an interface other than the first interface in interfaces corresponding to the first EVPN instance.

With reference to the first aspect, in some implementations of the first aspect, before that a first network device receives a BIERv6 packet sent by a second network device, the method further includes: The first network device receives a second EVPN route sent by the second network device, and the second EVPN route carries the second identifier. The first network device establishes the second correspondence based on the second identifier, the prefix of the first IPv6 address, and the first interface.

With reference to the first aspect, in some implementations of the first aspect, the second EVPN route is an Ethernet segment auto-discovery (ESAD) route, and the second identifier is carried in a prefix SID attribute field of the ESAD route.

According to a second aspect, a method for establishing a correspondence is provided. The method is applied to an Ethernet virtual private network EVPN, and the method includes:

A first network device receives a first EVPN route sent by a second network device. The first EVPN route carries a prefix of a first IPv6 address and a first identifier, the first Ipv6 address identifies the second network device, and the first identifier identifies, on the second network device, an EVPN instance to which a broadcast, unknown unicast, and multicast BUM packet belongs as a first EVPN instance. The first network device establishes a first correspondence based on the first EVPN route. The first correspondence is a correspondence between the prefix of the first Ipv6 address, the first identifier, and the first EVPN instance.

With reference to the second aspect, in some implementations of the second aspect, the first EVPN route is an inclusive multicast Ethernet tag (IMET) route. The prefix of the first Ipv6 address and the first identifier are carried in a multicast service identifier (MSID) attribute field or a prefix segment identifier prefix (SID) attribute field of the IMET route.

With reference to the second aspect, in some implementations of the second aspect, the method further includes: The first network device receives a BIERv6 packet sent by the second network device. The BIERv6 packet includes an internet protocol version 6 (Ipv6) header and the BUM packet, a source address (SA) of the Ipv6 header is the first Ipv6 address, the first network device is an egress device in a BIER domain, and the second network device is an ingress device in the BIER domain. The first network device determines, based on the first Ipv6 address, a first EVPN instance to which the BUM packet belongs. The first network device forwards the BUM packet based on the first EVPN instance.

With reference to the second aspect, in some implementations of the second aspect, the first Ipv6 address includes the first identifier. The first network device determines the first EVPN instance based on the prefix of the first Ipv6 address, the first identifier, and the first correspondence.

With reference to the second aspect, in some implementations of the second aspect, the first Ipv6 address further includes a second identifier. The second identifier is an identifier allocated by the first network device to a first Ethernet segment (ES), and the first ES is a dual-homed ES of the first network device and the second network device.

With reference to the second aspect, in some implementations of the second aspect, the method further includes: The first network device determines a first interface based on the prefix of the first Ipv6 address, the second identifier, and a second correspondence. The second correspondence is a correspondence between the prefix of the first Ipv6 address, the second identifier, and the first interface, and the first interface is an interface corresponding to the first ES on the first network device. That the first network device forwards the BUM packet based on the first EVPN instance includes: The first network device forwards the BUM packet to an interface other than the first interface in interfaces corresponding to the first EVPN instance.

With reference to the second aspect, in some implementations of the second aspect, before that the first network device receives a BIERv6 packet sent by the second network device, the method further includes: The first network device receives a second EVPN route sent by the second network device, and the second EVPN route carries the second identifier. The first network device establishes the second correspondence based on the second identifier, the prefix of the first Ipv6 address, and the first interface.

With reference to the second aspect, in some implementations of the second aspect, the second EVPN route is an Ethernet segment auto-discovery (ESAD) route, and the second identifier is carried in a prefix SID attribute field of the ESAD route.

According to a third aspect, a BIERv6 packet processing method is provided. The method is applied to an Ethernet virtual private network EVPN, and the method includes: A second network device receives a broadcast, unknown unicast, and multicast BUM packet, and the second network device is an ingress device in a BIER domain. The second network device obtains a BIERv6 packet based on the BUM packet. The BIERv6 packet includes an internet protocol version 6 (Ipv6) header, a BIER header, and the BUM packet, a source address (SA) of the Ipv6 header is a first Ipv6 address, the first Ipv6 address identifies the second network device, the BIER header includes a bit string bitstring, and the bit string indicates an egress device that is in the BIER domain and that receives the BUM packet. The second network device sends the BIERv6 packet to a first network device based on the bit string. The first network device is an egress device in the BIER domain.

With reference to the third aspect, in some implementations of the third aspect, the method further includes: The second network device determines the bit string based on whether to enable internet group management protocol/multicast listener discovery snooping (IGMP/MLD) Snooping.

With reference to the third aspect, in some implementations of the third aspect, the second network device does not enable the IGMP/MLD Snooping, the second network device determines a first-type BUM member, and the first-type BUM member includes all egress devices in the BIER domain. The second network device determines the bit string based on a bit forwarding router identifier BFR ID of each device in the first-type BUM member.

With reference to the third aspect, in some implementations of the third aspect, the second network device enables the IGMP/MLD Snooping, the second network device determines the first-type BUM member, and the first-type BUM member includes all egress devices in the BIER domain. The second network device determines a first bit string based on the BFR ID of each device in the first-type BUM member. The first bit string indicates an egress device that is in the BIER domain and that receives two types of packets: a broadcast B type packet and an unknown unicast U type packet. The second network device determines a second-type BUM member. The second-type BUM member includes an egress device that is in the BIER domain and that receives a multicast M type packet. The egress device does not enable the IGMP/MLD Snooping, or the egress device enables the IGMP/MLD Snooping and has sent multicast information to the second network device. The second network device determines a second bit string based on a BFR ID of each device in the second-type BUM member. The second bit string indicates the egress device that is in the BIER domain and that receives the multicast M type packet.

With reference to the third aspect, in some implementations of the third aspect, the first Ipv6 address includes a first identifier. The first identifier identifies, on the second network device, an EVPN instance to which the BUM packet belongs.

With reference to the third aspect, in some implementations of the third aspect, the first Ipv6 address further includes a second identifier. The second identifier is an identifier allocated by the first network device to a first Ethernet segment (ES), and the first ES is a dual-homed ES of the first network device and the second network device.

According to a fourth aspect, a first network device is provided. The first network device is applied to an Ethernet virtual private network EVPN, and includes a receiving module, a processing module, and a sending module.

The receiving module is configured to receive a BIERv6 packet sent by a second network device. The BIERv6 packet includes an internet protocol version 6 (Ipv6) header and a broadcast, unknown unicast, and multicast (BUM) packet, a source address (SA) of the Ipv6 header is a first Ipv6 address, the first Ipv6 address identifies the second network device, the first network device is an egress device in a BIER domain, and the second network device is an ingress device in the BIER domain.

The processing module is configured to determine, based on the first Ipv6 address, a first EVPN instance to which the BUM packet belongs.

The sending module is configured to forward the BUM packet based on the first EVPN instance.

With reference to the fourth aspect, in some implementations of the fourth aspect, the first Ipv6 address includes a first identifier. The first identifier identifies, on the second network device, an EVPN instance to which the BUM packet belongs as the first EVPN instance.

With reference to the fourth aspect, in some implementations of the fourth aspect, the processing module is specifically configured to determine the first EVPN instance based on a prefix of the first Ipv6 address, the first identifier, and a first correspondence. The first correspondence is a correspondence between the prefix of the first Ipv6 address, the first identifier, and the first EVPN instance.

With reference to the fourth aspect, in some implementations of the fourth aspect, the receiving module is further configured to receive a first EVPN route sent by the second network device, and the first EVPN route carries the prefix of the first Ipv6 address and the first identifier. The processing module is further configured to establish the first correspondence based on the first EVPN route.

With reference to the fourth aspect, in some implementations of the fourth aspect, the first EVPN route is an inclusive multicast Ethernet tag (IMET) route. The prefix of the first Ipv6 address and the first identifier are carried in a multicast service identifier (MSID) attribute field or a prefix segment identifier prefix (SID) attribute field of the IMET route.

With reference to the fourth aspect, in some implementations of the fourth aspect, the first Ipv6 address further includes a second identifier. The second identifier is an identifier allocated by the first network device to a first Ethernet segment (ES), and the first ES is a dual-homed ES of the first network device and the second network device.

With reference to the fourth aspect, in some implementations of the fourth aspect, the processing module is further configured to determine a first interface based on the prefix of the first Ipv6 address, the second identifier, and a second correspondence. The second correspondence is a correspondence between the prefix of the first Ipv6 address, the second identifier, and the first interface, and the first interface is an interface corresponding to the first ES on the first network device. The sending module is specifically configured to forward the BUM packet to an interface other than the first interface in interfaces corresponding to the first EVPN instance.

With reference to the fourth aspect, in some implementations of the fourth aspect, the receiving module is further configured to receive a second EVPN route sent by the second network device, and the second EVPN route carries the second identifier. The processing module is further configured to establish the second correspondence based on the second identifier, the prefix of the first Ipv6 address, and the first interface.

With reference to the fourth aspect, in some implementations of the fourth aspect, the second EVPN route is an Ethernet segment auto-discovery (ESAD) route, and the second identifier is carried in a prefix SID attribute field of the ESAD route.

According to a fifth aspect, a first network device is provided. The first network device is applied to an Ethernet virtual private network (EVPN), and includes a receiving module and a processing module.

The receiving module is configured to receive a first EVPN route sent by a second network device. The first EVPN route carries a prefix of a first Ipv6 address and a first identifier, the first Ipv6 address identifies the second network device, and the first identifier identifies, on the second network device, an EVPN instance to which a broadcast, unknown unicast, and multicast BUM packet belongs as a first EVPN instance.

The processing module is configured to establish a first correspondence based on the first EVPN route. The first correspondence is a correspondence between the prefix of the first Ipv6 address, the first identifier, and the first EVPN instance.

With reference to the fifth aspect, in some implementations of the fifth aspect, the first EVPN route is an inclusive multicast Ethernet tag (IMET) route. The prefix of the first Ipv6 address and the first identifier are carried in a multicast service identifier (MSID) attribute field or a prefix segment identifier prefix (SID) attribute field of the IMET route.

With reference to the fifth aspect, in some implementations of the fifth aspect, the receiving module is further configured to receive a BIERv6 packet sent by the second network device. The BIERv6 packet includes an internet protocol version 6 (Ipv6) header and the BUM packet, a source address (SA) of the IPv6 header is the first Ipv6 address, the first network device is an egress device in a BIER domain, and the second network device is an ingress device in the BIER domain. The processing module is further configured to determine, based on the first Ipv6 address, a first EVPN instance to which the BUM packet belongs.

The first network device further includes a sending module configured to forward the BUM packet based on the first EVPN instance.

With reference to the fifth aspect, in some implementations of the fifth aspect, the first Ipv6 address includes the first identifier. The processing module is specifically configured to determine the first EVPN instance based on the prefix of the first Ipv6 address, the first identifier, and the first correspondence.

With reference to the fifth aspect, in some implementations of the fifth aspect, the first Ipv6 address further includes a second identifier. The second identifier is an identifier allocated by the first network device to a first Ethernet segment (ES), and the first ES is a dual-homed ES of the first network device and the second network device.

With reference to the fifth aspect, in some implementations of the fifth aspect, the processing module is further configured to determine a first interface based on the prefix of the first IPv6 address, the second identifier, and a second correspondence. The second correspondence is a correspondence between the prefix of the first IPv6 address, the second identifier, and the first interface, and the first interface is an interface corresponding to the first ES on the first network device. The sending module is specifically configured to forward the BUM packet to an interface other than the first interface in interfaces corresponding to the first EVPN instance.

With reference to the fifth aspect, in some implementations of the fifth aspect, the receiving module is further configured to receive a second EVPN route sent by the second network device, and the second EVPN route carries the second identifier. The processing module is further configured to establish the second correspondence based on the second identifier, the prefix of the first IPv6 address, and the first interface.

With reference to the fifth aspect, in some implementations of the fifth aspect, the second EVPN route is an Ethernet segment auto-discovery (ESAD) route, and the second identifier is carried in a prefix SID attribute field of the ESAD route.

According to a sixth aspect, a second network device is provided. The second network device is applied to an Ethernet virtual private network EVPN, and includes a receiving module, a processing module, and a sending module.

The receiving module is configured to receive a broadcast, unknown unicast, and multicast (BUM) packet. The second network device is an ingress device in a BIER domain.

The processing module is configured to obtain a BIERv6 packet based on the BUM packet. The BIERv6 packet includes an internet protocol version 6 (IPv6) header, a BIER header, and the BUM packet, a source address (SA) of the Ipv6 header is a first IPv6 address, the first IPv6 address identifies the second network device, the BIER header includes a bit string bitstring, and the bit string indicates an egress device that is in the BIER domain and that receives the BUM packet.

The sending module is configured to send the BIERv6 packet to the first network device based on the bit string. The first network device is an egress device in the BIER domain.

With reference to the sixth aspect, in some implementations of the sixth aspect, the processing module is further configured to determine the bit string based on whether to enable internet group management protocol/multicast listener discovery snooping (IGMP/MLD) Snooping.

With reference to the sixth aspect, in some implementations of the sixth aspect, the second network device does not enable the IGMP/MLD Snooping, and the processing module is specifically configured to: determine a first-type BUM member, and the first-type BUM member includes all egress devices in the BIER domain; and determine the bit string based on a bit forwarding router identifier BFR ID of each device in the first-type BUM member.

With reference to the sixth aspect, in some implementations of the sixth aspect, the second network device enables the IGMP/MLD Snooping, and the processing module is specifically configured to: determine the first-type BUM member, and the first-type BUM member includes all egress devices in the BIER domain; determine a first bit string based on the BFR ID of each device in the first-type BUM member, and the first bit string indicates an egress device that is in the BIER domain and that receives two types of packets: a broadcast B type packet and an unknown unicast U type packet; determine a second-type BUM member, the second-type BUM member includes an egress device that is in the BIER domain and that receives a multicast M type packet, and the egress device does not enable the IGMP/MLD Snooping, or the egress device enables the IGMP/MLD Snooping and has sent multicast information to the second network device; and determine a second bit string based on a BFR ID of each device in the second-type BUM member, and the second bit string indicates the egress device that is in the BIER domain and that receives the multicast M type packet.

With reference to the sixth aspect, in some implementations of the sixth aspect, the first Ipv6 address includes a first identifier. The first identifier identifies, on the second network device, an EVPN instance to which the BUM packet belongs.

With reference to the sixth aspect, in some implementations of the sixth aspect, the first Ipv6 address further includes a second identifier. The second identifier is an identifier allocated by the first network device to a first Ethernet segment (ES), and the first ES is a dual-homed ES of the first network device and the second network device.

According to a seventh aspect, a first network device is provided. The first network device has a function of implementing behavior of the first network device in the foregoing method. The function may be implemented based on hardware, or may be implemented based on hardware executing corresponding software. The hardware or the software includes one or more modules corresponding to the foregoing function.

In an example embodiment, a structure of the first network device includes a processor and an interface. The processor is configured to support the first network device in performing a corresponding function in the foregoing method.

The first network device may further include a memory. The memory is configured to be coupled to the processor, and store program instructions and data that are required for the first network device.

In another example embodiment, the first network device includes a processor, a transmitter, a receiver, a random access memory, a read-only memory, and a bus. The processor is coupled to the transmitter, the receiver, the random access memory, and the read-only memory through the bus. When the first network device needs to be run, a bootloader in a basic input/output system or an embedded system that is built into the read-only memory is used to boot a system to start, and boot the first network device to enter a normal running state. After entering the normal running state, the first network device runs an application program and an operating system in the random access memory, to enable the processor to perform the method according to any one of the first aspect or the possible implementations of the first aspect or any one of the second aspect or the possible implementations of the second aspect.

According to an eighth aspect, a first network device is provided. The first network device includes a main control board and an interface board, and may further include a switching board. The first network device is configured to perform the method according to any one of the first aspect or the possible implementations of the first aspect or any one of the second aspect or the possible implementations of the second aspect. Specifically, the first network device includes a module configured to perform the method according to any one of the first aspect or the possible implementations of the first aspect or any one of the second aspect or the possible implementations of the second aspect.

According to a ninth aspect, a first network device is provided. The first network device includes a control module and a first forwarding subdevice. The first forwarding subdevice includes an interface board, and may further include a switching board. The first forwarding subdevice is configured to perform a function of the interface board in the eighth aspect, and may further perform a function of the switching board in the eighth aspect. The control module includes a receiver, a processor, a transmitter, a random access memory, a read-only memory, and a bus. The processor is coupled to the receiver, the transmitter, the random access memory, and the read-only memory through the bus. When the control module needs to be run, a bootloader in a basic input/output system or an embedded system that is built into the read-only memory is used to boot a system to start, and boot the control module to enter a normal running state. After entering the normal running state, the control module runs an application program and an operating system in the random access memory, to enable the processor to perform a function of the main control board in the eighth aspect.

It may be understood that the first network device may include any quantity of interfaces, processors, or memories in actual application.

According to a tenth aspect, a second network device is provided. The second network device has a function of implementing behavior of the second network device in the foregoing method. The function may be implemented based on hardware, or may be implemented based on hardware executing corresponding software. The hardware or the software includes one or more modules corresponding to the foregoing function.

In an example embodiment, a structure of the second network device includes a processor and an interface. The processor is configured to support the second network device in performing a corresponding function in the foregoing method.

The second network device may further include a memory. The memory is configured to be coupled to the processor, and store program instructions and data that are required for the second network device.

In another example embodiment, the second network device includes a processor, a transmitter, a receiver, a random access memory, a read-only memory, and a bus. The processor is coupled to the transmitter, the receiver, the random access memory, and the read-only memory through the bus. When the second network device needs to be run, a bootloader in a basic input/output system or an embedded system that is built into the read-only memory is used to boot a system to start, and boot the second network device to enter a normal running state. After entering the normal running state, the second network device runs an application program and an operating system in the random access memory, to enable the processor to perform the method according to any one of the third aspect or the possible implementations of the third aspect.

According to an eleventh aspect, a second network device is provided. The second network device includes a main control board and an interface board, and may further include a switching board. The second network device is configured to perform the method according to any one of the third aspect or the possible implementations of the third aspect. Specifically, the second network device includes a module configured to perform the method according to any one of the third aspect or the possible implementations of the third aspect.

According to a twelfth aspect, a second network device is provided. The second network device includes a control module and a first forwarding subdevice. The first forwarding subdevice includes an interface board, and may further include a switching board. The first forwarding subdevice is configured to perform a function of the interface board in the eleventh aspect, and may further perform a function of the switching board in the eleventh aspect. The control module includes a receiver, a processor, a transmitter, a random access memory, a read-only memory, and a bus. The processor is coupled to the receiver, the transmitter, the random access memory, and the read-only memory through the bus. When the control module needs to be run, a bootloader in a basic input/output system or an embedded system that is built into the read-only memory is used to boot a system to start, and boot the control module to enter a normal running state. After entering the normal running state, the control module runs an application program and an operating system in the random access memory, to enable the processor to perform a function of the main control board in the eleventh aspect.

It may be understood that the second network device may include any quantity of interfaces, processors, or memories in actual application.

According to a thirteenth aspect, a computer program product is provided. The computer program product includes computer program code. When the computer program code is run on a computer, the computer is enabled to perform the method according to any one of the first aspect or the possible implementations of the first aspect.

According to a fourteenth aspect, a computer program product is provided. The computer program product includes computer program code. When the computer program code is run on a computer, the computer is enabled to perform the method according to any one of the second aspect or the possible implementations of the second aspect.

According to a fifteenth aspect, a computer program product is provided. The computer program product includes computer program code. When the computer program code is run on a computer, the computer is enabled to perform the method according to any one of the third aspect or the possible implementations of the third aspect.

According to a sixteenth aspect, a computer-readable medium is provided. The computer-readable medium stores program code. When the computer program code is run on a computer, the computer is enabled to perform the method according to any one of the first aspect or the possible implementations of the first aspect. The computer-readable storage includes but is not limited to one or more of the following: a read-only memory (ROM), a programmable ROM (PROM), an erasable PROM (EPROM), a flash memory, an electrically EPROM (EEPROM), and a hard drive.

According to a seventeenth aspect, a computer-readable medium is provided. The computer-readable medium stores program code. When the computer program code is run on a computer, the computer is enabled to perform the method according to any one of the second aspect or the possible implementations of the second aspect. The computer-readable storage includes but is not limited to one or more of the following: a read-only memory (ROM), a programmable ROM (PROM), an erasable PROM (EPROM), a flash memory, an electrically EPROM (EEPROM), and a hard drive.

According to an eighteenth aspect, a computer-readable medium is provided. The computer-readable medium stores program code. When the computer program code is run on a computer, the computer is enabled to perform the method according to any one of the third aspect or the possible implementations of the third aspect. The computer-readable storage includes but is not limited to one or more of the following: a read-only memory (ROM), a programmable ROM (PROM), an erasable PROM (EPROM), a flash memory, an electrically EPROM (, EEPROM), and a hard drive.

According to a nineteenth aspect, a chip is provided. The chip includes a processor and a data interface. The processor reads, through the data interface, instructions stored in a memory, to perform the method according to any one of the first aspect or the possible implementations of the first aspect. In a specific implementation process, the chip may be implemented in a form of a central processing unit (CPU), a micro controller unit (MCU), a micro processing unit (micro processing unit, MPU), a digital signal processor (DSP), a system-on-a-chip (SoC), an application-specific integrated circuit (ASIC), a field programmable gate array (FPGA), or a programmable logic device (PLD).

According to a twentieth aspect, a chip is provided. The chip includes a processor and a data interface. The processor reads, through the data interface, instructions stored in a memory, to perform the method according to any one of the second aspect or the possible implementations of the second aspect. In a specific implementation process, the chip may be implemented in a form of a central processing unit (CPU), a micro controller unit (MCU), a micro processing unit MPU), a digital signal processor (DSP), a system-on-a-chip (SoC), an application-specific integrated circuit (ASIC), a field programmable gate array (FPGA), or a programmable logic device (PLD).

According to a twenty-first aspect, a chip is provided. The chip includes a processor and a data interface. The processor reads, through the data interface, instructions stored in a memory, to perform the method according to any one of the third aspect or the possible implementations of the third aspect. In a specific implementation process, the chip may be implemented in a form of a central processing unit (CPU), a micro controller unit (MCU), a micro processing unit (MPU), a digital signal processor (DSP), a system-on-a-chip (system-on-a-chip, SoC), an application-specific integrated circuit (ASIC), a field programmable gate array (FPGA), or a programmable logic device (PLD).

According to a twenty-second aspect, a system is provided. The system includes the first network device and the second network device.

BRIEF DESCRIPTION OF DRAWINGS

FIG. 1 is a schematic diagram of a multicast scenario applied to an embodiment of the present disclosure;

FIG. 2 is a schematic flowchart of a BIERv6 packet processing method according to an embodiment of the present disclosure;

DESCRIPTION OF EMBODIMENTS

Figure 3:
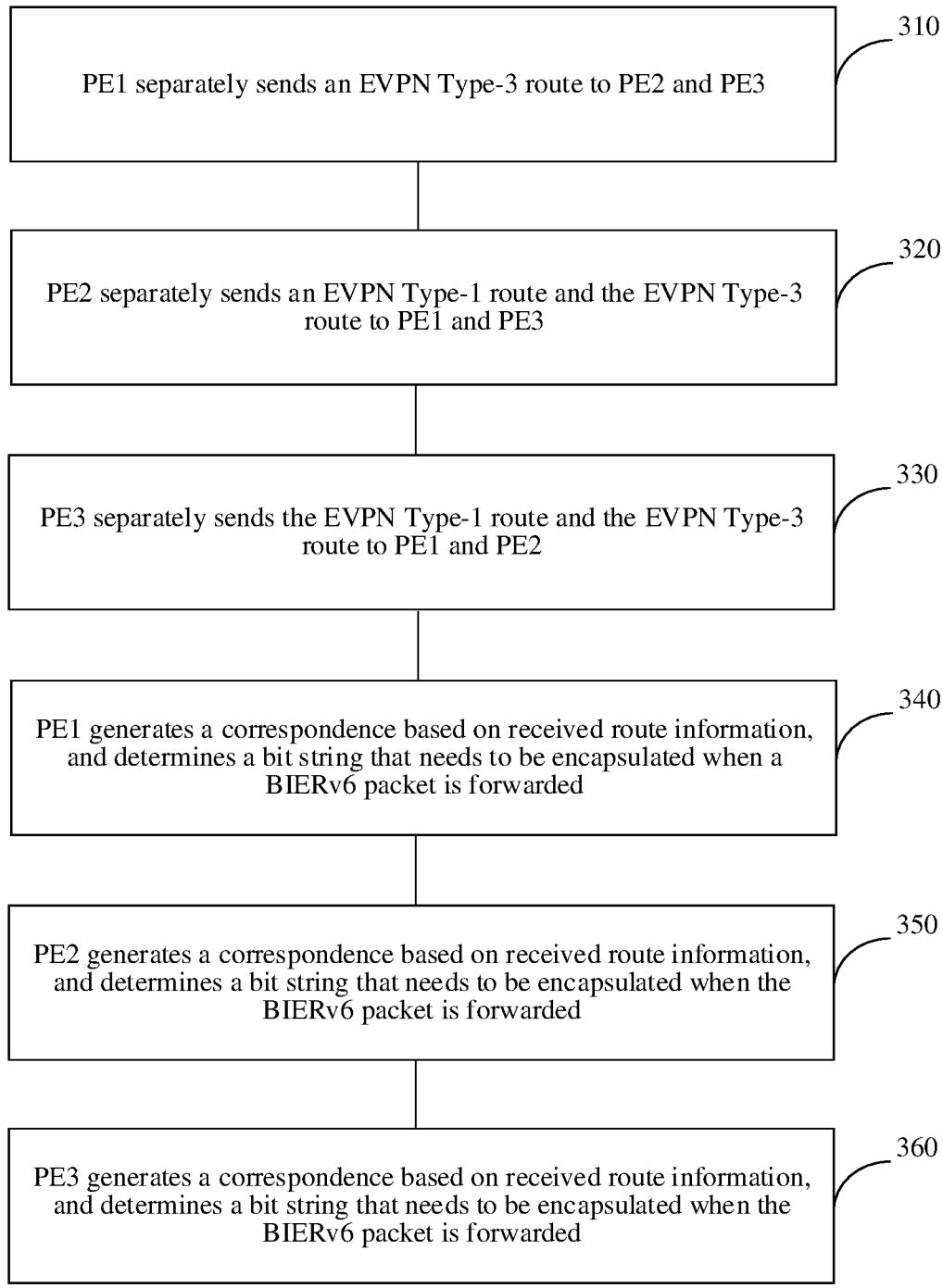
FIG. 3 is a schematic flowchart of a method for creating a BIERv6 tunnel in an EVPN according to an embodiment of the present disclosure.

The following describes technical solutions of the present disclosure with reference to accompanying drawings.

All aspects, embodiments, or features are presented in the present disclosure by describing a system that includes a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

In addition, in embodiments of the present disclosure, the terms such as "for example" and "such as" are used to represent giving an example, an illustration, or a description. Any embodiment or design scheme described as an "example" in the present disclosure should not be explained as being more preferred or having more advantages than another embodiment or design scheme. Exactly, the word "example" is used to present a concept in a specific manner.

In embodiments of the present disclosure, "corresponding (corresponding, relevant)" and "corresponding" may be interchangeably used sometimes. It should be noted that meanings expressed by the terms are consistent when differences are not emphasized.

A network architecture and a service scenario described in embodiments of the present disclosure are intended to describe the technical solutions in embodiments of the present disclosure more clearly, but constitute no limitation on the technical solutions provided in embodiments of the present disclosure. A person of ordinary skill in the art may learn that the technical solutions provided in embodiments of the present disclosure are also applicable to a similar technical problem as the network architecture evolves and a new service scenario emerges.

Reference to "an embodiment", "some embodiments", or the like described in this specification indicates that one or more embodiments of the present disclosure include a specific feature, structure, or characteristic described with reference to the embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "comprise", "include", "have", and their variants all mean "include but are not limited to", unless otherwise especially emphasized in another manner.

In the present disclosure, "at least one" means one or more, and "a plurality of" means two or more. The term "and/or" describes an association relationship between associated objects and represents that three relationships may exist. For example, A and/or B may represent the following three cases: Only A exists, both A and B exist, and only B exists. A and B may be in a singular or plural form. The character "/" generally indicates an "or" relationship between the associated objects. "At least one of the following items (pieces)" or a similar expression thereof refers to any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural.

Multicast is a data transmission mode in which data is efficiently sent to a plurality of receivers in a transmission control protocol (TCP)/internet protocol (IP) network at the same time by using one multicast address. A multicast source sends a multicast flow to a multicast group member in a multicast group through a link in a network, and all the multicast group members in the multicast group can receive the multicast flow. A multicast transmission mode implements a point-to-multipoint data connection between the multicast source and the multicast group members. The multicast flow needs to be transmitted only once on each network link, and the multicast flow is replicated only when the link has a branch. Therefore, the multicast transmission mode improves data transmission efficiency and reduces a possibility of congestion on a backbone network. An IP multicast technology implements efficient point-to-multipoint data transmission in an IP network, so that network bandwidth can be effectively saved, and network load can be reduced. Therefore, the IP multicast technology is widely used in many aspects, such as real-time data transmission, multimedia conferencing, data copy, an interactive personality television (IPTV), a game, and simulation.

FIG. 1 is a schematic diagram of a multicast scenario applied to an embodiment of the present disclosure. As shown in FIG. 1, a bearer network between provider edge (PE) 1, P1, P2, PE2, and PE3 at a transmit end may be an Ethernet virtual private network (EVPN). A customer edge (CE) 1 device and a CE2 device may access the EVPN by using an internet group management protocol (IGMP).

For example, the CE1 device accesses the EVPN through a link. For example, the CE1 device accesses the EVPN through a link between the CE1 device and PE1, and PE1 may also be referred to as a single-homed PE. The CE2 device accesses the EVPN through two links. For example, the CE2 device accesses the EVPN through a link between the CE2 device and PE2 and a link between the CE2 device and PE3. PE2 and PE3 may also be referred to as dual-homed PEs. Two links between CE2, PE2, and PE3 may form an Ethernet segment (ES).

It should be understood that CE2 in FIG. 1 may alternatively access the EVPN through a plurality of links, and a plurality of PEs in the EVPN that is connected by CE2 through a plurality of links may also be referred to as multi-homed PEs. For ease of description, a dual-homed PE is used as an example for description in FIG. 1.

In a related technical solution, an ingress replication (IR) tunnel is introduced into the EVPN. The IR tunnel is used to carry a broadcast, unknown unicast, and multicast (BUM) data flow in the EVPN. In addition, at an ingress (for example, a PE device at an EVPN ingress), a BUM packet is replicated to all virtual extensible local area network tunnel endpoints (VTEP) belonging to a same virtual extensible local area network identifier (VNI). In this case, when a quantity of PE devices in the EVPN is large, public network link bandwidth consumption is high, a large amount of bandwidth is wasted, and BUM packet replication efficiency is low.

In view of this, an embodiment of the present disclosure provides a BIERv6 packet processing method. A bit index explicit replication over internet protocol version 6 (BIERv6) tunnel is introduced into the EVPN. The BIERv6 tunnel is used to carry a BUM packet in the EVPN. The BUM packet may be replicated on demand based on a bit string in a BIER header, to reduce waste of public network link bandwidth and improve BUM packet replication efficiency.

It should be understood that BIERv6 is a combination of a BIER technology and an internet protocol version 6. In a BIERv6 network, a router that supports the BIER technology is referred to as a bit forwarding router (BFR). A BFR that performs BIER encapsulation on a user packet to form a BIERv6 packet is referred to as a bit forwarding ingress router (BFIR). A BFR that performs decapsulation to obtain the user packet from the BIERv6 packet is referred to as a bit forwarding egress router (BFER).

A multicast forwarding domain formed by one or more BFIRs, one or more BFRs, and one or more BFERs is referred to as a BIER domain. The BFIR is located in the ingress of the BIER domain, the BFR is located in the middle of the BIER domain, and the BFER is located in the egress of the BIER domain. It should be understood that the BFIR and the BFER in the BIER domain may also be referred to as edge BFRs in the BIER domain.

For example, in the multicast scenario shown in FIG. 1, the BIERv6 tunnel used to carry the BUM packet is introduced into the EVPN. In the BIERv6 tunnel, PE1, P1, P2, PE2, and PE3 may form a BIER domain. For example, PE1 may be the foregoing BFIR, and is responsible for performing BIER encapsulation on a BUM packet obtained from CE1 to form the BIERv6 packet. P1 and P2 may be the foregoing BFRs, and are responsible for forwarding the BIERv6 packet. PE2 and PE3 may be the foregoing BFERs, and are responsible for decapsulating the BIERv6 packet to obtain a BUM packet, and sending the BUM packet to CE2. For another example, a BUM packet sent by CE2 is load balanced to PE2 or PE3. Here, that the BUM packet is load balanced to PE2 by CE2 is used as an example, as the BFIR, PE2 is responsible for performing BIER encapsulation on a BUM packet obtained from CE2 to form the BIERv6 packet. P1 and P2 may be the foregoing BFRs, and are responsible for forwarding the BIERv6 packet. PE1 and PE3 may be the foregoing BFERs, and are responsible for decapsulating the BIERv6 packet to obtain a BUM packet.

In the BIER domain, a globally unique bit position identifier in an entire BIER sub-domain (SD) may be configured for the edge BFR. For example, a value is configured as a BFR identifier (BFR ID) for each edge BFR. For example, the BFR ID may be a value ranging from 1 to 256. All BFR IDs in the BIER domain form a bit string. Each bit in the bit string identifies an edge BFR. For example, a least significant bit (rightmost bit) in the bit string identifies a BFER whose BFR ID is 1, and a $2^{nd}$ bit from right to left in the bit string identifies a BFER whose BFR ID is 2. For example, if a value of a bit is 1, it indicates that the BIERv6 packet needs to be sent to a BFER represented by the BFR ID, and if the value of the bit is 0, it indicates that the BIERv6 packet does not need to be sent to the BFER represented by the BFR ID.

With reference to FIG. 2, the following describes in detail a BIERv6 packet processing method provided in an embodiment of the present disclosure.

FIG. 2 is a schematic flowchart of a BIERv6 packet processing method according to an embodiment of the present disclosure. As shown in FIG. 2, the method may include steps 210 to 230. The following separately describes steps 210 to 230 in detail.

Step 210: A first network device receives a BIERv6 packet sent by a second network device, where the BIERv6 packet includes an Ipv6 header and a BUM packet, and a source address (SA) of the Ipv6 header is a first Ipv6 address.

For example, the first network device is an egress device in a BIER domain, and the second network device is an ingress device in the BIER domain.

The BIERv6 packet received by the first network device may include the Ipv6 header and the BUM packet, the source address (SA) of the Ipv6 header is the first Ipv6 address, and the first Ipv6 address identifies the second network device. It should be understood that there is a plurality of implementations of the first Ipv6 address. For example, the first Ipv6 address includes a first identifier, and the first identifier identifies, on the second network device, an EVPN instance to which the BUM packet belongs as a first EVPN instance. For another example, the first Ipv6 address includes the first identifier and a second identifier. The second identifier is an identifier allocated by the first network device to a first Ethernet segment (ES), and the first ES is a dual-homed ES of the first network device and the second network device. It should be further understood that one BUM data flow may include a plurality of BUM packets.

It should be noted that, for example, the first Ipv6 address includes the first identifier, in a possible implementation, the first Ipv6 address may be an existing Ipv6 address, and which bits in the Ipv6 address are classified as the first identifier. In another possible implementation, the first Ipv6 address may be a newly constructed Ipv6 address, and which bits in the Ipv6 address are specified as the first identifier.

Step 220: The first network device determines, based on the first Ipv6 address, the first EVPN instance to which the BUM packet belongs.

For example, the first Ipv6 address includes the first identifier. The first network device may determine the first EVPN instance based on a prefix of the first Ipv6 address, the first identifier, and a first correspondence. The first correspondence is a correspondence between the prefix of the first Ipv6 address, the first identifier, and the first EVPN instance.

It should be understood that, before the first network device receives the BIERv6 packet sent by the second network device, the method further includes: The first network device receives a first EVPN route sent by the second network device, and the first EVPN route carries the prefix of the first Ipv6 address and the first identifier. The first network device establishes the first correspondence based on the first EVPN route.

For example, the first EVPN route is an inclusive multicast Ethernet tag (IMET) route. The prefix of the first Ipv6 address and the first identifier are carried in a multicast service identifier MSID attribute field or a prefix segment identifier prefix (SID) attribute field of the IMET route.

For another example, the first Ipv6 address includes the first identifier and a second identifier. The first network device may determine the first identifier based on the first Ipv6 address, and determine the first EVPN instance based on the prefix of the first Ipv6 address, the first identifier, and the first correspondence. In this implementation, the first network device may further determine a first interface based on the prefix of the first Ipv6 address, the second identifier, and a second correspondence. The second correspondence is a correspondence between the prefix of the first Ipv6 address, the second identifier, and the first interface, and the first interface is an interface corresponding to the first ES on the first network device.

It should be understood that before the first network device receives the BIERv6 packet sent by the second network device, the method further includes: The first network device receives a second EVPN route sent by the second network device, and the second EVPN route carries the second identifier. The first network device establishes the second correspondence based on the second identifier, the prefix of the first Ipv6 address, and the first interface.

For example, the second EVPN route is an Ethernet segment auto-discovery (ESAD) route, and the second identifier is carried in a prefix SID attribute field of the ESAD route.

Step 230: The first network device forwards the BUM packet based on the first EVPN instance.

That the first Ipv6 address includes the first identifier is used as an example. After determining the first EVPN instance, the first network device may decapsulate the BIERv6 packet to obtain the BUM packet, and send the BUM packet to an interface that corresponds to the first EVPN instance and that is connected to a user side.

That the first Ipv6 address includes the first identifier and the second identifier is used as an example. After determining the first EVPN instance and a first interface that needs to be pruned, the first network device may forward the BUM packet to an interface other than the first interface in interfaces corresponding to the first EVPN instance.

In the foregoing technical solutions, a BIERv6 tunnel is introduced into an EVPN, and the BIERv6 tunnel is used to carry a BUM packet in the EVPN. The BUM packet may be replicated on demand based on a bit string in a BIER header, to reduce waste of public network link bandwidth, and improve BUM packet replication efficiency.

The following describes in detail, using the multicast scenario shown in FIG. 1 as an example and with reference to FIG. 3, a specific implementation of creating the BIERv6 tunnel in the EVPN is described. It should be understood that an example in FIG. 3 is merely intended to help a person skilled in the art understand embodiments of the present disclosure, instead of limiting embodiments of the present disclosure to a specific value or a specific scenario shown in the example. A person skilled in the art can clearly make various equivalent modifications or changes based on the example provided in FIG. 3 below, and such modifications or changes also fall within the scope of embodiments of the present disclosure.

FIG. 3 is a schematic flowchart of a method for creating a BIERv6 tunnel in an EVPN according to an embodiment of the present disclosure. As shown in FIG. 3, the method may include steps 310 to 360. The following separately describes steps 310 to 360 in detail.

Step 310: PE1 separately sends an EVPN Type-3 route to PE2 and PE3.

For example, PE1 may separately send the EVPN Type-3 route to PE2 and PE3. The EVPN Type-3 route may also be referred to as an inclusive multicast Ethernet tag (IMET) route. The EVPN Type-3 route may carry a related attribute of a BIERv6 tunnel identifier and a multicast service identifier (MSID) attribute. The following separately describes the two attributes in detail.

The related attribute of the BIERv6 tunnel identifier may carry related information about a BIERv6 tunnel that carries an EVPN BUM packet. For example, the related information about the BIERv6 tunnel may include but is not limited to:

a BIER sub-domain to which a PE device in the BIERv6 tunnel belongs, a BFR ID allocated to the PE device, and the like.

For example, it is assumed that a BIER sub-domain to which PE1, PE2, and PE3 belong is sub-domain 0, a BFR ID allocated to PE1 is 1, a BFR ID allocated to PE2 is 2, and a BFR ID allocated to PE3 is 3. Related information about the BIERv6 tunnel identifier carried in the EVPN Type-3 route that is sent by PE1 to PE2 and PE3 includes: sub-domain 0, and BFR ID=1.

Figure 4:
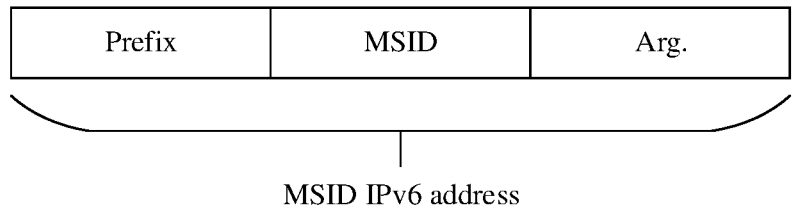
FIG. 4 is a schematic block diagram of an MSID Ipv6 address according to an embodiment of the present disclosure.

The MSID attribute identifies an EVPN forwarding instance in the EVPN. The attribute needs to include at least one Ipv6 address (for example, the foregoing first Ipv6 address, may also be referred to as an MSID Ipv6 address). As shown in FIG. 4, the MSID Ipv6 address may include the following three fields: a Prefix field, an MSID field (corresponding to the foregoing first identifier), and an Arg. Field (corresponding to the foregoing second identifier). Optionally, the MSID attribute may further include a prefix length field and an MSID length field. The prefix length field indicates a prefix length of the MSID Ipv6 address, and the MSID length indicates which bits in the MSID Ipv6 address identify an EVPN instance. An Arg. Length may be obtained through calculation based on the MSID length and the prefix length, for example, Arg. Length=128−MSID length−prefix length. Optionally, the MSID attribute may further include an originating router ID (which may also be referred to as an EVPN originator IP) of the Type-3 route. In this example, the EVPN originator IP is an originator IP of PE1.

For example, it is assumed that the originator IP of PE1 is 1::1, an EVPN forwarding instance corresponding to PE1 is evpn_inst1, and an allocated MSID Ipv6 address is 11::1:. The prefix length is 64 bits, and the MSID length is 32 bits. The originator IP carried in the EVPN Type-3 route that is sent by PE1 to PE2 and PE3 is 1::1, and the MSID Ipv6 address is 11::1:. The prefix length is 64 bits, and the MSID length is 32 bits.

Step 320: PE2 separately sends an EVPN Type-1 route and the EVPN Type-3 route to PE1 and PE3.

For example, PE2 may separately send the EVPN Type-1 route and the EVPN Type-3 route to PE1 and PE3. The EVPN Type-1 route may also be referred to as an ES AD route. The following separately describes in detail information carried in the EVPN Type-1 route and the EVPN Type-3 route.

1. EVPN Type-3 Route

The related attribute of the BIERv6 tunnel identifier and the MSID attribute are carried. For specific descriptions, refer to the description in step 310. For example, it is assumed that the BIER sub-domain to which PE2 belongs is sub-domain 0, the BFR ID allocated to PE2 is 2, an originator IP of PE2 is 2::2, an EVPN forwarding instance corresponding to PE2 is evpn_inst1, and an allocated MSID Ipv6 address is 22::1:. The prefix length is 64 bits, and the MSID length is 32 bits. Related information about a BIERv6 tunnel identifier carried in the EVPN Type-3 route sent by PE2 to PE1 and PE3 includes: sub-domain 0, BFR ID=2. The carried originator IP is 2::2, and the MSID Ipv6 address is 22::1:. The prefix length is 64 bits, and the MSID length is 32 bits.

2. EVPN Type-1 Route

As a dual-homed PE, PE2 further sends the EVPN Type-1 route to another PE. The EVPN Type-1 route carries an Arg.FE2 prefix SID attribute. Specifically, the EVPN Type-1 route carries a prefix SID attribute, and the attribute identifies an Arg.FE2 SID of an ES to which the route belongs. For example, an ESI value of a dual-homed Ethernet segment of PE2 and PE3 is "0022.1002.1002.1002.1001", an Arg.FE2 SID allocated by PE2 to the ES is ::1, and an Arg.FE2 SID allocated by PE3 to the ES is also ::1. An ESI value carried in the EVPN Type-1 route that is sent by PE2 to PE1 and PE3 is "0022.1002.1002.1002.1001", the Arg.FE2 SID is ::1, and a next hop of the route is 3::3.

Step 330: PE3 separately sends the EVPN Type-1 route and the EVPN Type-3 route to PE1 and PE2.

For example, PE3 may separately send the EVPN Type-1 route and the EVPN Type-3 route to PE1 and PE2. The following separately describes in detail information carried in the EVPN Type-1 route and the EVPN Type-3 route.

1. EVPN Type-3 Route

The related attribute of the BIERv6 tunnel identifier and the MSID attribute are carried. For specific descriptions, refer to the description in step 310. For example, it is assumed that the BIER sub-domain to which PE3 belongs is sub-domain 0, the BFR ID allocated to PE3 is 3, an originator IP of PE3 is 3::3, an EVPN forwarding instance corresponding to PE3 is evpn_inst1, and an allocated MSID Ipv6 address is 33::1:. The prefix length is 64 bits, and the MSID length is 32 bits. Related information about a BIERv6 tunnel identifier carried in the EVPN Type-3 route sent by PE3 to PE1 and PE2 includes: sub-domain 0, BFR ID=3. The carried originator IP is 3::3, and the MSID Ipv6 address is 33::1:. The prefix length is 64 bits, and the MSID length is 32 bits.

2. EVPN Type-1 Route

The Arg.FE2 prefix SID attribute is carried, and each route carries the prefix SID attribute that identifies the Arg.FE2 SID of the ES to which the route belongs. For example, the ESI value of the dual-homed Ethernet segment of PE2 and PE3 is "0022.1002.1002.1002.1001", and the Arg.FE2 SID allocated by PE3 to the ES is ::1. An ESI value carried in the EVPN Type-1 route that is sent by PE3 to PE1 and PE2 is "0022.1002.1002.1002.1001", the Arg.FE2 SID is ::1, and a next hop of the route is 3::3.

Step 340: PE1 generates a correspondence based on received route information, and determines a bit string that needs to be encapsulated when a BIERv6 packet is forwarded.

PE1 receives Type-3 routes sent by other PE devices (for example, PE2 and PE3). These Type-3 routes carry a BIERv6 tunnel identifier attribute and the MSID attribute. PE1 further generates a correspondence between an MSID Ipv6 address and a local EVPN instance based on the MSID attribute, so that a BIERv6 BUM packet received on a public network interface is directed to a corresponding local EVPN forwarding instance for forwarding. In addition, PE1 calculates, based on the BIERv6 tunnel identifier attribute, the bit string that needs to be encapsulated when the BIERv6 packet is forwarded.

1. PE1 generates the correspondence between the MSID Ipv6 address and the local EVPN instance based on the Type-3 routes sent by other PE devices (for example, PE2 and PE3).

For example, the EVPN forwarding instance corresponding to PE1 is evpn_inst1. An MSID Ipv6 address in the EVPN Type-3 route received by PE1 from PE2 is 22::1: and an MSID Ipv6 address in the EVPN Type-3 route received by PE1 from PE3 is 33::1:. A correspondence that is between the MSID Ipv6 address and the local EVPN instance and that is generated by PE1 is 22::1:→evpn_inst1; 33::1:→evpn_inst1.

2. PE1 generates a correspondence between the originator IP and an MSID Prefix based on the Type-3 routes sent by other PE devices (for example, PE2 and PE3).

PE1 may obtain a Prefix (which may also be referred to as the MSID Prefix) of the MSID Ipv6 address based on the prefix length carried in the Type-3 route, and generate a correspondence between the MSID Prefix and the EVPN originator IP.

For example, the MSID Ipv6 address in the EVPN Type-3 route received by PE1 from PE2 is 22::1:, the prefix length is 64, and the originator IP is 2::2. An MSID Ipv6 address in the EVPN Type-3 route received by PE1 from PE3 is 33::1:, the prefix length is 64, and the originator IP is 3::3. The correspondence that is between the originator IP and the MSID Prefix and that is generated by PE1 is as follows: 2::2→22:/64, 3::3→33:/64.

3. PE1 determines, based on the Type-3 routes sent by other PE devices (for example, PE2 and PE3), the bit string that needs to be encapsulated when the BIERv6 packet is forwarded.

Specifically, PE1 may calculate, based on a sub-domain and a BFR ID of the Type-3 routes sent by PE devices (for example, PE2 and EVPN-PE3), the bit string that needs to be encapsulated when the BIERv6 packet is forwarded. For example, PE1 may calculate, based on whether to enable IGMP/multicast listener discovery (MLD) Snooping on an EVPN PE, the bit string that needs to be encapsulated. It should be understood that whether the PE enables the IGMP/MLD Snooping may be determined based on a Type-3 route sent by the PE. The following describes in detail a method for determining a bit string in different cases.

In a possible implementation, PE1 does not enable the IGMP/MLD Snooping. PE1 may directly calculate the bit string based on a BFR ID of a remote BUM member (for example, PE2 and PE3, which is generated by using Type-3 routes sent by PE2 and PE3). For example, if a BFR ID of PE2 is 2 and a BFR ID of PE3 is 3, a generated bit string for BUM replication is 0110.

In another possible implementation, PE1 enables the IGMP/MLD Snooping, and other PEs (PE2 and PE3) partially enable (or completely enables) the IGMP/MLD Snooping.

For example, PE1 does not receive a Type-6 route of multicast (S, G) or (*, G) from other PEs (PE2 and PE3), and does not obtain an IGMP/MLD report corresponding to (S, G) or (*, G) by snooping on a local AC interface. PE1 may generate a BUM member based on the foregoing method, and calculate the bit string (for example, the bit string is 0110). However, because PE1 enables the IGMP/MLD Snooping, the bit string is used to guide PE1 to forward broadcast and unknown unicast traffic.

For another example, in a case in which PE1 forwards multicast traffic, after receiving a multicast flow (S, G) from an AC interface, PE1 determines, based on the Type-3 routes sent by other PEs (PE2 and PE3), which remote devices do not enable the IGMP/MLD Snooping. In addition, PE1 selects a BFR ID of a remote PE device that does not enable the IGMP/MLD Snooping or a remote PE device that enables the IGMP/MLD Snooping and has sent a Type-6 route, to participate in bit string calculation. For example, it is assumed that the BFR ID of PE2 is 2, the BFR ID of PE3 is 3, PE2 does not enable the IGMP/MLD Snooping, and PE3 enables the IGMP/MLD Snooping but has not sent a Type-6 route of (S1, G1) or (*, G1). PE1 receives a multicast flow (S1, G1) from the AC interface. PE3 enables the IGMP/MLD Snooping, but PE3 has not sent the Type-6 route of (S1, G1) or (*, G1). This indicates that PE3 does not need to receive (S1, G1) traffic, and only PE2 needs to receive the (S1, G1) traffic. Therefore, the BFR ID of PE2 participates in the bit string calculation, the BFR ID of PE3 does not participate in the bit string calculation, and a bit string calculated by PE1 is 0010. The bit string is used to guide PE1 to forward multicast (S1, G1) traffic. For another example, PE2 does not enable the IGMP/MLD Snooping, PE3 enables the IGMP/MLD Snooping and has sent the Type-6 route of (S1, G1) or (*, G1). PE1 receives the multicast flow (S1, G1) from the AC interface. PE3 enables the IGMP/MLD Snooping and has sent the Type-6 route of (S1, G1) or (*, G1). This indicates that PE3 needs to receive the (S1, G1) traffic. Therefore, both the BFR ID of PE2 and the BFR ID of PE3 need to participate in the bit string calculation. The bit string calculated by PE1 is 0110. The bit string is used to guide PE1 to forward the multicast (S1, G1) traffic.

Step 350: PE2 generates a correspondence based on received route information, and determines a bit string that needs to be encapsulated when the BIERv6 packet is forwarded.

PE2 receives Type-3 routes and Type-1 routes sent by other PE devices (for example, PE1 and PE3) and processes the routes as follows.

1. PE2 generates the correspondence between the MSID Ipv6 address and the local EVPN instance based on the Type-3 routes sent by other PE devices (for example, PE1 and PE3).

For example, the EVPN forwarding instance corresponding to PE2 is evpn_inst1. An MSID Ipv6 address in the EVPN Type-3 route received by PE2 from PE1 is 11::1:, and an MSID Ipv6 address in the EVPN Type-3 route received by PE2 from PE3 is 33::1:. A correspondence that is between the MSID Ipv6 address and the local EVPN instance and that is generated by PE2 is 11::1:→evpn_inst1; 33::1:→evpn_inst1.

2. PE2 generates the correspondence between the originator IP and the MSID Prefix based on the Type-3 routes sent by other PEs (for example, PE1 and PE3).

PE2 may obtain a Prefix (which may also be referred to as the MSID Prefix) of the MSID Ipv6 address based on the prefix length carried in the Type-3 route, and generate the correspondence between the MSID Prefix and the EVPN originator IP.

For example, the MSID Ipv6 address in the EVPN Type-3 route received by PE2 from PE1 is 11::1:, the prefix length is 64, and the originator IP is 1::1. The MSID Ipv6 address in the EVPN Type-3 route received by PE2 from PE3 is 33::1:, the prefix length is 64, and the originator IP is 3::3. The correspondence that is between the originator IP and the MSID Prefix and that is generated by PE2 is as follows: 1::1→11:/64, 3::3→33:/64.

3. PE2 generates a pruning relational table of a split horizon AC interface based on the Type-1 route.

PE2 determines, based on an ES of the Type-1 route, whether a same ES exists locally. If the same ES exists and a corresponding AC-side interface exists, PE2 obtains the Arg.FE2 SID from a prefix SID attribute of the Type-1 route, and searches for, based on an originator IP of an originating router of the Type-1 route, an MSID Prefix of the originating router. In addition, PE2 uses "MSID Prefix+Arg.FE2 SID" as an index to generate a mapping relationship of "MSID Prefix+Arg.FE2 SID→AC interface". The mapping relationship is used for pruning of AC interfaces with the same ES in split horizon.

For example, it is assumed that a dual-homed ES of PE2 and PE3 is ES1, an AC interface of ES1 on PE2 is Interface_Pe2toCe, and an AC interface on PE3 is Interface_Pe3toCe. PE2 determines, based on a next hop of 3::3 of the Type-1 route sent by PE3 and a correspondence ("3::3→33::/64") that is between the originator IP and the MSID Prefix and that is established by PE2, that a corresponding MSID Prefix is 33::. PE2 may further obtain an Arg.FE2 SID of ::1 from the Type-1 route sent by PE3. PE2 uses MSID Prefix+Arg.FE2 SID as the index to generate a mapping relationship of "33::1(MSID Prefix+Arg.FE2 SID) →Interface_Pe2toCe".

It should be understood that, with respect to an MSID Ipv6 address (MSID Prefix+MSID+Arg.FE2 SID), foregoing MSID Prefix+Arg.FE2 SID is equivalent to setting an MSID part in the MSID Ipv6 address to 0.

4. PE2 determines, based on the Type-3 routes sent by other PE devices (for example, PE1 and PE3), the bit string that needs to be encapsulated when the BIERv6 packet is forwarded.

A method is similar to the method for determining the bit string by PE1. For details, refer to the method for determining the bit string by PE1 in step 340.

Step 360: PE3 generates a correspondence based on received route information, and determines a bit string that needs to be encapsulated when the BIERv6 packet is forwarded.

As a dual-homed PE, PE3 receives Type-3 routes and Type-1 routes sent by other PEs (for example, PE1 and PE2) and processes the routes as follows.

1. PE3 generates the correspondence between the MSID Ipv6 address and the local EVPN instance based on the Type-3 routes sent by other PEs (for example, PE1 and PE2). For example, the EVPN forwarding instance corresponding to PE3 is evpn_inst1. An MSID Ipv6 address in the EVPN Type-3 route received by PE3 from PE1 is 11::1:, and an MSID Ipv6 address in the EVPN Type-3 route received by PE3 from PE2 is 22::1:. A correspondence that is between the MSID Ipv6 address and the local EVPN instance and that is generated by PE3 is 11::1:→evpn_inst1; 22::1: →evpn_inst1.

2. PE3 generates the correspondence between the originator IP and the MSID Prefix based on the Type-3 routes sent by other PE devices (for example, PE1 and PE2).

PE3 may obtain the Prefix (which may also be referred to as the MSID Prefix) of the MSID Ipv6 address based on the prefix length carried in the Type-3 route, and generate the correspondence between the MSID Prefix and the EVPN originator IP.

For example, the MSID Ipv6 address in the EVPN Type-3 route received by PE3 from PE1 is 11::1:, the prefix length is 64, and the originator IP is 1::1. The MSID Ipv6 address in the EVPN Type-3 route received by PE3 from PE2 is 22::1:, the prefix length is 64, and the originator IP is 2::2. The correspondence that is between the originator IP and the MSID Prefix and that is generated by PE3 is as follows: 1::1→11::/64, 2::2→22::/64.

3. PE3 generates the pruning relational table of the split horizon AC interface based on the Type-1 route.

PE3 determines, based on the ES of the Type-1 route, whether a same ES exists locally. If the same ES exists and a corresponding AC-side interface exists, PE3 obtains the Arg.FE2 SID from the prefix SID attribute of the Type-1 route, and searches for, based on the originator IP of the Type-1 route, the MSID Prefix of the originating router of the Type-1 route. In addition, PE3 uses "MSID Prefix+ Arg.FE2 SID" as the index to generate the mapping relationship of "MSID Prefix+Arg.FE2 SID→AC interface".

The mapping relationship is used for pruning of AC interfaces with the same ES in split horizon.

For example, it is assumed that the dual-homed ES of PE2 and PE3 is ES1, the AC interface of ES1 on PE2 is Interface_Pe2toCe, and the AC interface on PE3 is Interface_Pe3toCe. PE3 determines, based on a next hop of 2::2 of the Type-1 route sent by PE2 and a correspondence ("2::2→22::/64") that is between the originator IP and the MSID Prefix and that is established by PE3, that the corresponding MSID Prefix is 22::. PE3 may further obtain the Arg.FE2 SID of ::1 from the Type-1 route sent by PE2. PE3 uses MSID Prefix+Arg.FE2 SID as the index to generate a mapping relationship of "22::1(MSID Prefix+Arg.FE2 SID) →Interface_Pe3toCe".

4. PE3 determines, based on the Type-3 routes sent by other PE devices (for example, PE1 and PE2), the bit string that needs to be encapsulated when the BIERv6 packet is forwarded.

A method is similar to the method for determining the bit string by PE1. For details, refer to the method for determining the bit string by PE1 in step 340.

Figure 5:
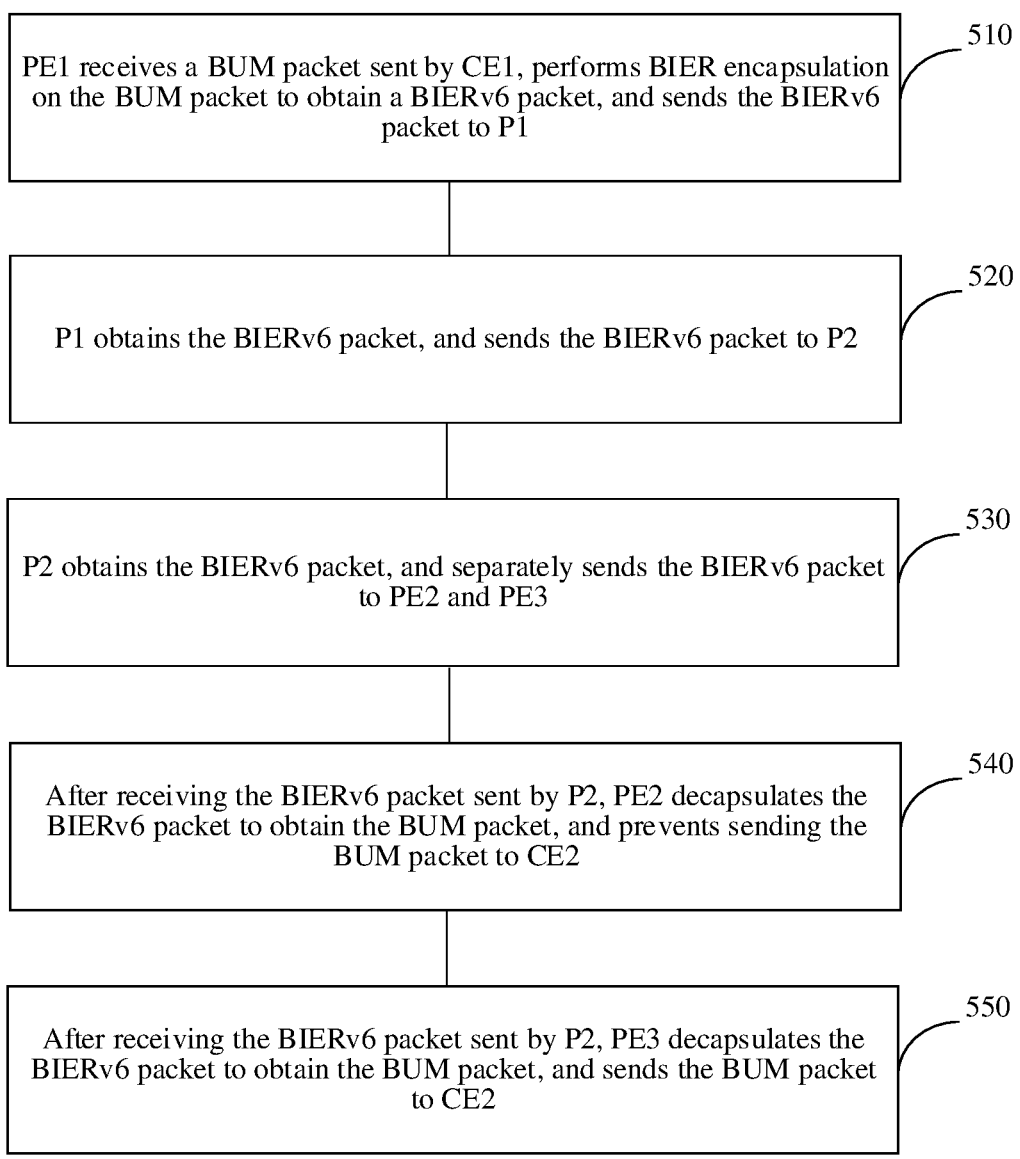
FIG. 5 is another schematic flowchart of a BIERv6 packet processing method according to an embodiment of the present disclosure.

With reference to FIG. 5, the following describes in detail a specific implementation of a BIERv6 packet processing method provided in an embodiment of the present disclosure by using an example in which a single-homed PE (for example, PE1) is used as an ingress device in a BIER domain in the multicast scenario shown in FIG. 1. It should be understood that an example in FIG. is merely intended to help a person skilled in the art understand embodiments of the present disclosure, instead of limiting the embodiments of the present disclosure to a specific value or a specific scenario shown in the example. A person skilled in the art can clearly make various equivalent modifications or changes based on the example provided in FIG. 5 below, and such modifications or changes also fall within the scope of embodiments of the present disclosure.

FIG. 5 is another schematic flowchart of a BIERv6 packet processing method according to an embodiment of the present disclosure. As shown in FIG. 5, the method may include steps 510 to 550. The following separately describes steps 510 to 550 in detail.

Step 510: PE1 receives a BUM packet sent by CE1, performs BIER encapsulation on the BUM packet to obtain a BIERv6 packet, and sends the BIERv6 packet to P1.

It should be understood that one BUM data flow may include one or more BUM packets.

As an ingress device in a BIER domain, PE1 is responsible for performing BIER encapsulation on a BUM packet received from CE1 to obtain the BIERv6 packet. For example, a packet format of BIERv6 encapsulation is an Ipv6 header+a BIER header+a BUM packet. The BIER header may be included in an Ipv6 extension header, and the BUM packet is used as a payload of an outer Ipv6 header. In this type of encapsulation, the Ipv6 header and the Ipv6 extension header including the BIER header jointly form an outer packet header of an inner original multicast packet. The outer packet header of the inner original multicast packet may also be referred to as a BIERv6 header in embodiments of the present disclosure. The Ipv6 extension header including the BIER header is not specifically limited in embodiments of the present disclosure. For example, the Ipv6 extension header may be a destination option header (DOH). For another example, the Ipv6 extension header may alternatively be a routing header (RH).

In the BIERv6 packet, the Ipv6 header may include but is not limited to a source address (SA) field and a destination address (DA) field. The BIER header may include a bit string field. For example, an SA of an Ipv6 header encapsulated by PE1 is an MSID Ipv6 address. For example, an MSID Ipv6 address allocated by PE1 to an EVPN instance evpn_inst1 is 11::1:. ADA of the Ipv6 header is an End.BIER address of P1. A bit string of the BIER header may be determined according to the method in step 340. For example, both PE2 and PE3 need to receive the BUM packet, and the bit string may be 0110.

It should be understood that the End.BIER address is not a common Ipv6 address, but a specific Ipv6 address used by a device to process the BIERv6 packet. P1 is used as an example. After the End.BIER address is configured on P1, a forwarding entry with a 128-bit mask of the address is formed in a forwarding information base (FIB), and the forwarding entry identifies the address as End.BIER. When receiving the BIERv6 packet, P1 searches the FIB based on the destination address DA. If a search result in the FIB is an End.BIER address, P1 performs an End.BIER-specific action, that is, P1 continues to process a BIER header in the Ipv6 extension packet header. Otherwise, if the destination address is a common Ipv6 destination address, the FIB search result indicates that the packet is an Ipv6 packet that is sent to this router and that includes a destination options extension packet header. In this case, the packet may be sent to a CPU for processing. A purpose of data plane processing is not achieved.

After obtaining the BIERv6 packet, PE1 may forward the BIERv6 packet to P1. Specifically, for example, each edge BFR in the BIER domain may flood an allocated BFR ID in the BIER domain by using an interior gateway protocol (IGP) or a border gateway protocol (BGP), so that another edge BFR in the BIER domain may establish a bit index forwarding table (BIFT) identifier based on the flooding information. For example, PE1 may obtain, by flooding, a BFR ID 2 of PE2 and a BFR ID 3 of PE3. If PE1 needs to separately send the BIERv6 packet to PE2 whose BFR ID is 2 and PE3 whose BFR ID is 3, and next hop devices from PE1 to PE2 and PE3 are P1, a BIFT established by PE1 is as follows: neighbor (Nbr)=P1, forwarding bit mask (FBM) =0110. Nbr=P1 indicates that a neighbor of PE1 is P1. FBM=0110 indicates that the BIFT is used to guide, when any one of a $2^{nd}$ bit and a 3rd bit of a bit string of the BIERv6 packet from right to left is 1, PE1 to send the BIERv6 packet to P1. Therefore, PE1 may send the BIERv6 packet to P1 based on the BIFT.

Step 520: P1 obtains the BIERv6 packet, and sends the BIERv6 packet to P2.

After receiving the BIERv6 packet sent by PE1, P1 may forward the BIERv6 packet to P2 based on the BIFT. For example, P1 may obtain, by flooding, the BFR ID 2 of PE2 and the BFR ID 3 of PE3. If P1 needs to separately send the BIERv6 packet to PE2 whose BFR ID is 2 and PE3 whose BFR ID is 3, and next hop devices from P1 to PE2 and PE3 are P2, a BIFT established by P1 is as follows: neighbor (Nbr)=P2, forwarding bit mask (FBM)=0110. Nbr=P2 indicates that a neighbor of P1 is P2. FBM=0110 indicates that the BIFT is used to guide, when any one of the $2^{nd}$ bit and the 3rd bit of the bit string of the BIERv6 packet from right to left is 1, P1 to send the BIERv6 packet to P2. Therefore, P1 may send the BIERv6 packet to P2 based on the BIFT.

Specifically, when sending the BIERv6 packet to P2, P1 may perform an AND operation on a bit string (0110) of the BIER header and an FBM field (0110) corresponding to Nbr=P2 in the BIFT entry. In this embodiment, a result of the AND operation is 0110. Therefore, in the BIERv6 packet sent by P1 to P2, the bit string of the BIER header is 0110, and the DA of the Ipv6 header is an End.BIER address of P2.

Step 530: P2 obtains the BIERv6 packet, and separately sends the BIERv6 packet to PE2 and PE3.

After receiving the BIERv6 packet sent by P1, P2 may separately send the BIERv6 packet to PE2 and PE3 based on the BIFT. For example, P2 may obtain, by flooding, the BFR ID 2 of PE2 and the BFR ID 3 of PE3. If P2 needs to separately send the BIERv6 packet to PE2 whose BFR ID is 2 and PE3 whose BFR ID is 3, a next hop device from P2 to PE2 is PE2, and a next hop device from P2 to PE3 is PE3, a BIFT established by P2 is as follows: Nbr=PE2, FBM=0010; Nbr=PE3, FBM=0100. Nbr=PE2 indicates that a neighbor of P2 is PE2. FBM=0010 indicates that the BIFT is used to guide, when the $2^{nd}$ bit of the bit string of the BIERv6 packet from right to left is 1, P2 to send the BIERv6 packet to PE2. Nbr=PE3 indicates that the neighbor of P2 is PE3. FBM=0100 indicates that the BIFT is used to guide, when the $3^{rd}$ bit of the bit string of the BIERv6 packet from right to left is 1, P2 to send the BIERv6 packet to PE3.

Specifically, when sending the BIERv6 packet to PE2, P2 may perform the AND operation on the bit string (0110) of the BIER header and an FBM field (0010) corresponding to Nbr=PE2 in the BIFT entry. In this embodiment, the result of the AND operation is 0010. Therefore, in the BIERv6 packet sent by P2 to PE2, the bit string of the BIER header is 0010, and the DA of the Ipv6 header is an End.BIER address of PE2. When sending the BIERv6 packet to PE3, P2 may perform the AND operation on the bit string (0110) of the BIER header and an FBM field (0100) corresponding to Nbr=PE3 in the BIFT entry. In this embodiment, the result of the AND operation is 0100. Therefore, in the BIERv6 packet sent by P2 to PE3, the bit string of the BIER header is 0100, and the DA of the Ipv6 header is an End.BIER address of PE3.

Step 540: After receiving the BIERv6 packet sent by P2, PE2 decapsulates the BIERv6 packet to obtain a BUM packet, and prevents sending the BUM packet to CE2.

After receiving the BIERv6 packet sent by P2, PE2 may determine, based on the bit string field 0010 of the BIER header and an established BIFT, that PE2 is an egress device in the BIER domain. Specifically, for example, the BFR ID of PE2 is 2, and the BIFT established by PE2 is as follows: Nbr=*PE2*, FBM=0010. The identifier * indicates PE2, Nbr=*PE2* indicates that PE2 is a next hop device of PE2. FBM=0010 indicates that, when the $2^{nd}$ bit of the bit string of the BIERv6 packet from right to left is 1, PE2 determines that PE2 is the egress device in the BIER domain, and is responsible for decapsulating the BIERv6 packet to obtain the BUM packet.

After obtaining the BUM packet, PE2 determines, based on an SA of the Ipv6 header of the BIERv6 packet and a correspondence between the MSID Ipv6 address and the local EVPN instance, an EVPN instance to which the BUM packet belongs. For example, an SA of the Ipv6 header of the BIERv6 packet obtained by PE2 is an MSID Ipv6 address 11::1: allocated by PE1 to an EVPN instance evpn_inst1. PE2 determines, based on 11::1: and a correspondence <11::1:→evpn_inst1> generated by PE2, that the EVPN instance to which the BUM packet belongs is evpn_inst1. Because PE2 and PE3 serve as dual-homed PEs, PE2 determines, based on an active/standby role of PE2 in a dual-homed link, whether to send the BUM packet on a corresponding AC link. For example, it is assumed that PE2 is a standby device, PE3 is an active device. When PE2 serves as the standby device and sends the BUM packet to the evpn_inst1 instance through a corresponding Interface_Pe2ToCe2 interface, PE2 is blocked.

Step 550: After receiving the BIERv6 packet sent by P2, PE3 decapsulates the BIERv6 packet to obtain a BUM packet, and sends the BUM packet to CE2.

After receiving the BIERv6 packet sent by P2, PE3 may determine, based on the bit string field 0100 of the BIER header and an established BIFT, that PE3 is the egress device in the BIER domain. Specifically, for example, the BFR ID of PE3 is 3, and the BIFT established by PE3 is as follows: Nbr=*PE3*, FBM=0100. The identifier * indicates PE3, Nbr=*PE3* indicates that PE3 is a next hop device of PE3. FBM=0100 indicates that, when the 3rd bit of the bit string of the BIERv6 packet from right to left is 1, PE3 determines that PE3 is the egress device in the BIER domain, and is responsible for decapsulating the BIERv6 packet to obtain the BUM packet.

After obtaining the BUM packet, PE3 determines, based on the SA of the Ipv6 header of the BIERv6 packet and the correspondence between the MSID Ipv6 address and the local EVPN instance, the EVPN instance to which the BUM packet belongs. For example, an SA of the Ipv6 header of the BIERv6 packet obtained by PE3 is the MSID Ipv6 address 11::1: allocated by PE1 to the EVPN instance evpn_inst1. PE3 determines, based on 11::1: and the correspondence <11::1:→evpn_inst1> generated by PE2, that the EVPN instance to which the BUM packet belongs is evpn_inst1. Because PE2 and PE3 serve as dual-homed PEs, PE3 determines, based on an active/standby role of PE3 in the dual-homed link, whether to send the BUM packet on the corresponding AC link. For example, assumed that PE2 is the standby device, PE3 is the active device. When PE3 serves as the active device and sends the BUM packet to the evpn_inst1 instance through a corresponding Interface_Pe3ToCe2 interface, PE3 is permitted. That is, PE3 sends the BUM packet to CE2 belonging to the evpn_inst1 instance through the Interface_Pe3ToCe2 interface.

Figure 6:
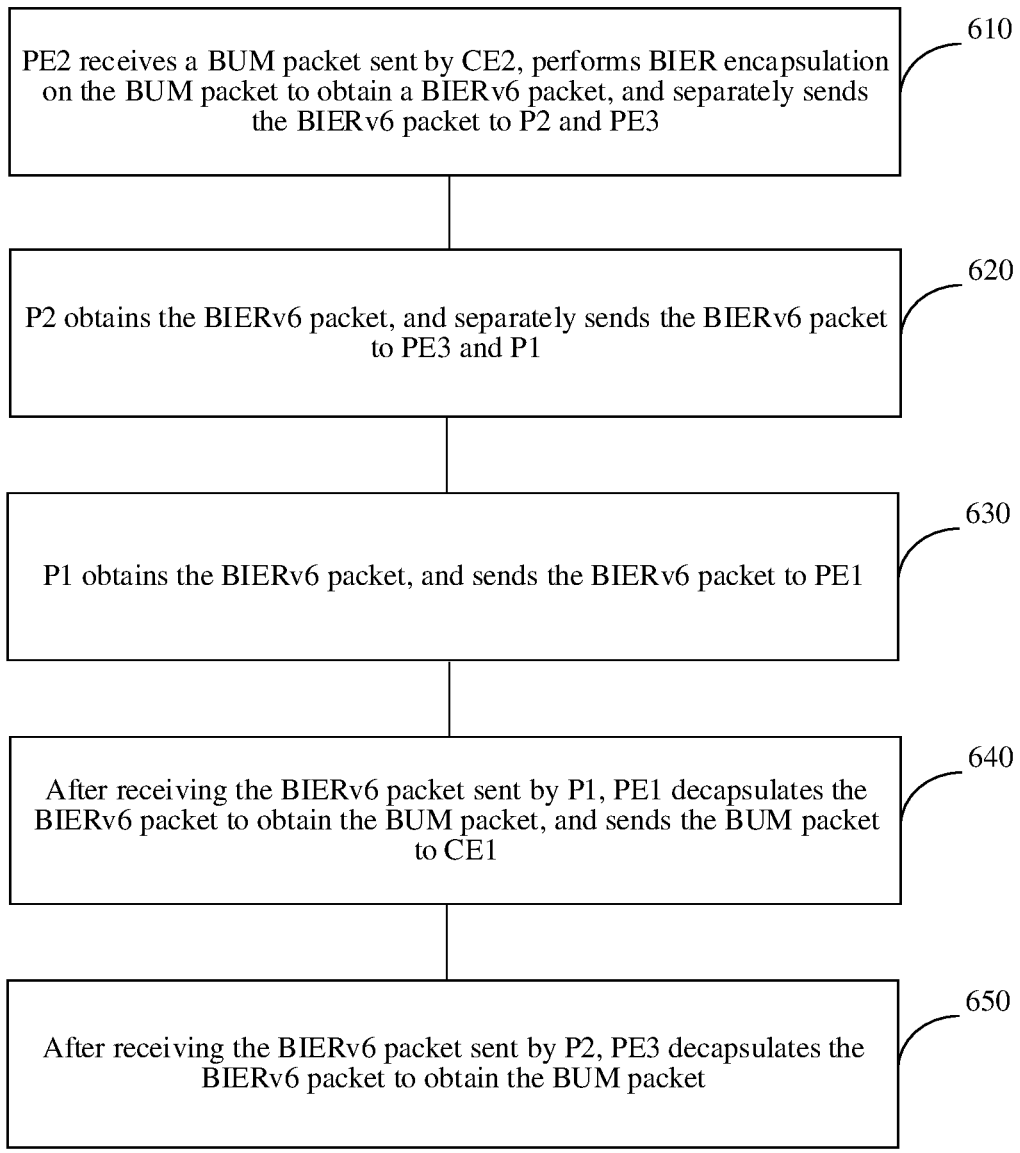
FIG. 6 is another schematic flowchart of a BIERv6 packet processing method according to an embodiment of the present disclosure.

With reference to FIG. 6, the following describes in detail a specific implementation of a BIERv6 packet processing method provided in an embodiment of the present disclosure by using an example in which a dual-homed PE (for example, PE2 or PE3) is used as the ingress device in the BIER domain in the multicast scenario shown in FIG. 1. It should be understood that an example in FIG. 6 is merely intended to help a person skilled in the art understand embodiments of the present disclosure, instead of limiting the embodiments of the present disclosure to a specific value or a specific scenario shown in the example. A person skilled in the art can clearly make various equivalent modifications or changes based on the example provided in FIG. 6 below, and such modifications or changes also fall within the scope of embodiments of the present disclosure.

FIG. 6 is another schematic flowchart of a BIERv6 packet processing method according to an embodiment of the present disclosure. As shown in FIG. 6, the method may include steps 610 to 650. The following separately describes steps 610 to 650 in detail.

Step 610: PE2 receives a BUM packet sent by CE2, performs BIER encapsulation on the BUM packet to obtain a BIERv6 packet, and separately sends the BIERv6 packet to P2 and PE3.

The BUM packet sent by CE2 is load balanced to PE2 or PE3. Herein, that the BUM packet is load balanced to PE2 by CE2 is used as an example. As an ingress device in a BIER domain, after receiving the BUM packet sent by CE2, PE2 is responsible for performing BIER encapsulation on the BUM packet to obtain the BIERv6 packet.

A dual-homed ES of PE2 and PE3 is ES1, and PE2 receives the BUM packet sent by CE2 through an interface Interface_Pe2ToCe2. Therefore, an SA of an Ipv6 header is an MSID Ipv6 address allocated by PE2 to evpn_inst1 and an Arg.FE2 SID allocated by PE2 to ES1. For example, the MSID Ipv6 address allocated by PE2 to evpn_inst1 is 22::1:, the Arg.FE2 SID allocated by PE2 to ES1 is ::1, and the SA of the Ipv6 header is 22::1:1. A DA of the Ipv6 header is an End.BIER address of P2. A bit string of a BIER header may be determined based on the method in step 340. It is assumed that both PE1 and PE3 need to receive the BUM packet, and the bit string may be 0101.

After obtaining the BIERv6 packet, PE2 may forward the BIERv6 packet to P2. Specifically, for example, PE2 may obtain, by flooding, a BFR ID 1 of PE1 and a BFR ID 3 of PE3. If PE2 needs to separately send the BIERv6 packet to PE1 whose BFR ID is 1 and PE3 whose BFR ID is 3, and next hop devices from PE2 to PE1 and PE3 are P2, a BIFT established by PE2 is as follows: Nbr=P2, FBM=0101. Nbr=P2 indicates that a neighbor of PE2 is P2. FBM=0101 indicates that the BIFT is used to guide, when any one of a 1st bit and a 3rd bit of a bit string of the BIERv6 packet from right to left is 1, PE2 to send the BIERv6 packet to P2. Therefore, PE2 may send the BIERv6 packet to P2 based on the BIFT.

Step 620: P2 obtains the BIERv6 packet, and separately sends the BIERv6 packet to PE3 and P1.

After receiving the BIERv6 packet sent by PE2, P2 may separately send the BIERv6 packet to PE3 and P1 based on the BIFT. For example, P2 may obtain, by flooding, the BFR ID 1 of PE1 and the BFR ID 3 of PE3. If P2 needs to separately send the BIERv6 packet to PE1 whose BFR ID is 1 and PE3 whose BFR ID is 3, a next hop device from P2 to PE3 is PE3, and a next hop device from P2 to PE1 is P1, a BIFT established by P2 is as follows: Nbr=PE3, FBM=0100; Nbr=P1, FBM=0001. Nbr=PE3 indicates that the neighbor of P2 is PE3. FBM=0100 indicates that the BIFT is used to guide, when the $3^{rd}$ bit of the bit string of the BIERv6 packet from right to left is 1, P2 to send the BIERv6 packet to PE3. Nbr=P1 indicates that the neighbor of P2 is P1. FBM=0001 indicates that the BIFT is used to guide, when the $1^{st}$ bit of the bit string of the BIERv6 packet from right to left is 1, P2 to send the BIERv6 packet to P1.

Specifically, when sending the BIERv6 packet to PE3, P2 may perform an AND operation on a bit string (0101) of the BIER header and an FBM field (0100) corresponding to Nbr=PE3 in the BIFT entry. In this embodiment, a result of the AND operation is 0100. Therefore, in the BIERv6 packet sent by P2 to PE3, the bit string of the BIER header is 0100, and the DA of the Ipv6 header is an End.BIER address of PE3. When sending the BIERv6 packet to P1, P2 may perform the AND operation on the bit string (0101) of the BIER header and an FBM field (0001) corresponding to Nbr=P1 in the BIFT entry. In this embodiment, the result of the AND operation is 0001. Therefore, in the BIERv6 packet sent by P2 to P1, the bit string of the BIER header is 0001, and the DA of the Ipv6 header is an End.BIER address of P1.

Step 630: P1 obtains the BIERv6 packet, and sends the BIERv6 packet to PE1.

After receiving the BIERv6 packet sent by P2, P1 may send the BIERv6 packet to PE1 based on the BIFT. For example, P1 may obtain, by flooding, the BFR ID 1 of PE1. If P1 needs to send the BIERv6 packet to PE1 whose BFR ID is 1, and a next hop device from P1 to PE1 is PE1, a BIFT established by P1 is as follows: Nbr=PE1, FBM=0001. Nbr=PE1 indicates that a neighbor of P1 is PE1. FBM=0001 indicates that the BIFT is used to guide, when the $1^{st}$ bit of the bit string of the BIERv6 packet from right to left is 1, P1 to send the BIERv6 packet to PE1.

Specifically, when sending the BIERv6 packet to PE1, P1 may perform the AND operation on a bit string (0001) of the BIER header and an FBM field (0001) corresponding to Nbr=PE1 in the BIFT entry. In this embodiment, the result of the AND operation is 0001. Therefore, in the BIERv6 packet sent by P1 to PE1, the bit string of the BIER header is 0001, and the DA of the Ipv6 header is an End.BIER address of PE1.

Step 640: After receiving the BIERv6 packet sent by P1, PE1 decapsulates the BIERv6 packet to obtain the BUM packet, and sends the BUM packet to CE1.

After receiving the BIERv6 packet sent by P1, PE1 may determine, based on a bit string field of 0001 of the BIER header and an established BIFT, that PE1 is an egress device in the BIER domain. Specifically, for example, the BFR ID of PE1 is 1, and the BIFT established by PE1 is as follows: Nbr=*PE1*, FBM=0001. An identifier * indicates PE1. Nbr=*PE1* indicates that PE1 is a next hop device of PE1. FBM=0001 indicates that, when the 1st bit of the bit string of the BIERv6 packet from right to left is 1, PE1 determines that PE1 is the egress device in the BIER domain, and is responsible for decapsulating the BIERv6 packet to obtain the BUM packet.

PE1 is single-homing. Therefore, after being imported to an evpn_inst1 instance, the BUM packet is allowed to be sent through an interface Interface_Pe1ToCe1 without pruning.

Step 650: After receiving the BIERv6 packet sent by P2, PE3 decapsulates the BIERv6 packet to obtain the BUM packet.

After receiving the BIERv6 packet sent by P2, PE3 may determine, based on the bit string field 0100 of the BIER header and an established BIFT, that PE3 is the egress device in the BIER domain. Specifically, for example, the BFR ID of PE3 is 3, and the BIFT established by PE3 is as follows: Nbr=*PE3*, FBM=0100. The identifier * indicates PE3. Nbr=*PE3* indicates that PE3 is a next hop device of PE3. FBM=0100 indicates that, when the 3rd bit of the bit string of the BIERv6 packet from right to left is 1, PE3 determines that PE3 is the egress device in the BIER domain, and is responsible for decapsulating the BIERv6 packet to obtain the BUM packet.

After PE3 obtains the BUM packet, because an SA of the BIERv6 packet is the MSID Ipv6 address allocated by PE2 to evpn_inst1 and the Arg.FE2 SID allocated by PE2 to ES1, PE3 sets, based on an MSID length of a Type-3 route sent by PE2, an MSID part of the MSID Ipv6 address to 0, and obtains MSID Prefix+Arg.FE2 SID. Then, the AC interface that needs to be pruned is determined based on the correspondence between "MSID Prefix+Arg.FE2 SID" established by PE3 in FIG. 3 and the AC interface. The BUM packet is broadcast on a local AC interface other than the AC interface that needs to be pruned. For example, if the SA of the BIERv6 packet is 22::1:1, the MSID length is 32, and the MSID part in the MSID Ipv6 address is set to 0, obtained MSID Prefix+Arg.FE2 SID is 22::1. After PE3 determines, based on 22::1 and a correspondence "22::1(MSID Prefix+Arg.FE2 SID)→Interface_Pe3toCe", that the BUM packet needs to be imported to the evpn_inst1 instance on PE3, an interface Interface_Pe3ToCe2 is pruned. PE3 sends the BUM packet through a local AC interface other than the interface Interface_Pe3toCe.

It should be understood that sequence numbers of the processes do not mean execution sequences in embodiments of the present disclosure. The execution sequences of the processes should be determined based on functions and internal logic of the processes, and should not be construed as any limitation on the implementation processes of embodiments of the present disclosure.

With reference to FIG. 1 to FIG. 6, the foregoing describes in detail the BIERv6 packet processing method provided in embodiments of the present disclosure. The following describes in detail apparatus embodiments of the present disclosure with reference to FIG. 7 to FIG. 13. It should be understood that the descriptions of the method embodiments correspond to descriptions of the apparatus embodiments. Therefore, for parts that are not described in detail, refer to the descriptions in the foregoing method embodiments.

Figure 7:
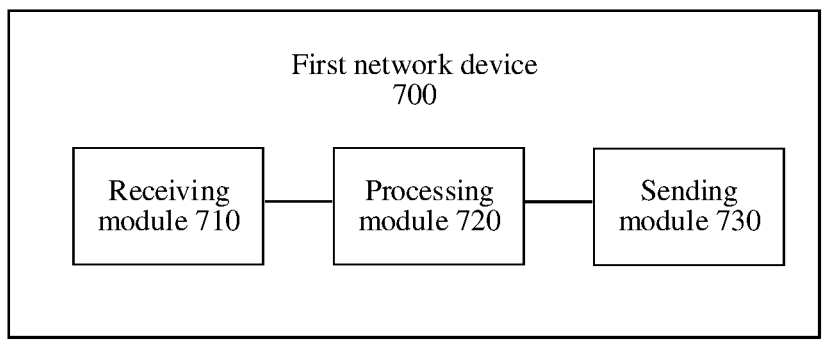
FIG. 7 is a schematic diagram of a structure of a first network device 700 according to an embodiment of the present disclosure.

FIG. 7 is a schematic diagram of a structure of a first network device 700 according to an embodiment of the present disclosure. The first network device 700 shown in FIG. 7 may perform corresponding steps performed by the first network device in the method in the foregoing embodiments. As shown in FIG. 7, the first network device 700 includes a receiving module 710, a processing module 720, and a sending module 730.

The receiving module 710 is configured to receive a BIERv6 packet sent by a second network device. The BIERv6 packet includes an internet protocol version 6 (IPv6) header and a broadcast, unknown unicast, and multicast (BUM) packet, a source address (SA) of the IPv6 header is a first Ipv6 address, the first Ipv6 address identifies the second network device, the first network device is an egress device in a BIER domain, and the second network device is an ingress device in the BIER domain.

The processing module 720 is configured to determine, based on the first Ipv6 address, a first EVPN instance to which the BUM packet belongs.

The sending module 730 is configured to forward the BUM packet based on the first EVPN instance.

Optionally, the first Ipv6 address includes a first identifier. The first identifier identifies, on the second network device, an EVPN instance to which the BUM packet belongs as the first EVPN instance.

Optionally, the processing module 720 is specifically configured to determine the first EVPN instance based on a prefix of the first Ipv6 address, the first identifier, and a first correspondence. The first correspondence is a correspondence between the prefix of the first Ipv6 address, the first identifier, and the first EVPN instance.

Optionally, the receiving module 710 is further configured to receive a first EVPN route sent by the second network device, and the first EVPN route carries the prefix of the first Ipv6 address and the first identifier. The processing module 720 is further configured to establish the first correspondence based on the first EVPN route.

Optionally, the first EVPN route is an inclusive multicast Ethernet tag (IMET) route. The prefix of the first Ipv6 address and the first identifier are carried in a multicast service identifier (MSID) attribute field or a prefix segment identifier prefix (SID) attribute field of the IMET route.

Optionally, the first Ipv6 address further includes a second identifier. The second identifier is an identifier allocated by the first network device to a first Ethernet segment (ES), and the first ES is a dual-homed ES of the first network device and the second network device.

Optionally, the processing module 720 is further configured to determine a first interface based on the prefix of the first Ipv6 address, the second identifier, and a second correspondence. The second correspondence is a correspondence between the prefix of the first Ipv6 address, the second identifier, and the first interface, and the first interface is an interface corresponding to the first ES on the first network device. The sending module 730 is specifically configured to forward the BUM packet to an interface other than the first interface in interfaces corresponding to the first EVPN instance.

Optionally, the receiving module 710 is further configured to receive a second EVPN route sent by the second network device, and the second EVPN route carries the second identifier. The processing module 720 is further configured to establish the second correspondence based on the second identifier, the prefix of the first Ipv6 address, and the first interface.

Optionally, the second EVPN route is an Ethernet segment auto-discovery (ESAD) route, and the second identifier is carried in a prefix SID attribute field of the ESAD route.

Figure 8:
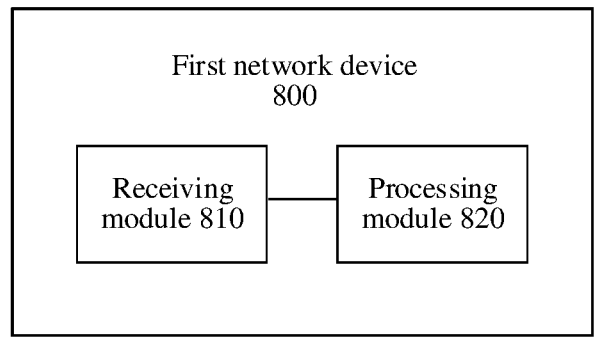
FIG. 8 is a schematic diagram of a structure of another first network device 800 according to an embodiment of the present disclosure.

FIG. 8 is a schematic diagram of a structure of another first network device 800 according to an embodiment of the present disclosure. The first network device 800 shown in FIG. 8 may perform corresponding steps performed by the first network device in the method in the foregoing embodiments. As shown in FIG. 8, the first network device 800 includes a receiving module 810 and a processing module 820.

The receiving module 810 is configured to receive a first EVPN route sent by a second network device. The first EVPN route carries a prefix of a first Ipv6 address and a first identifier, the first Ipv6 address identifies the second network device, and the first identifier identifies, on the second network device, an EVPN instance to which a broadcast, unknown unicast, and multicast BUM packet belongs as a first EVPN instance.

The processing module 820 is configured to establish a first correspondence based on the first EVPN route. The first correspondence is a correspondence between the prefix of the first Ipv6 address, the first identifier, and the first EVPN instance.

Optionally, the first EVPN route is an inclusive multicast Ethernet tag (IMET) route. The prefix of the first Ipv6 address and the first identifier are carried in a multicast service identifier (MSID) attribute field or a prefix segment identifier prefix (SID) attribute field of the IMET route.

Optionally, the receiving module 810 is further configured to receive a BIERv6 packet sent by the second network device. The BIERv6 packet includes an internet protocol version 6 (Ipv6) header and the BUM packet, a source address (SA) of the IPv6 header is the first Ipv6 address, the first network device is an egress device in a BIER domain, and the second network device is an ingress device in the BIER domain. The processing module 720 is further configured to determine, based on the first Ipv6 address, a first EVPN instance to which the BUM packet belongs.

The first network device 800 further includes a sending module 830 configured to forward the BUM packet based on the first EVPN instance.

Optionally, the first Ipv6 address includes the first identifier. The processing module 820 is specifically configured to determine the first EVPN instance based on the prefix of the first Ipv6 address, the first identifier, and the first correspondence.

Optionally, the first Ipv6 address further includes a second identifier. The second identifier is an identifier allocated by the first network device to a first Ethernet segment (ES), and the first ES is a dual-homed ES of the first network device and the second network device.

Optionally, the processing module 820 is further configured to determine a first interface based on the prefix of the first Ipv6 address, the second identifier, and a second correspondence. The second correspondence is a correspondence between the prefix of the first Ipv6 address, the second identifier, and the first interface, and the first interface is an interface corresponding to the first ES on the first network device. The sending module 830 is specifically configured to forward the BUM packet to an interface other than the first interface in interfaces corresponding to the first EVPN instance.

Optionally, the receiving module 810 is further configured to receive a second EVPN route sent by the second network device, and the second EVPN route carries the second identifier. The processing module 820 is further configured to establish the second correspondence based on the second identifier, the prefix of the first Ipv6 address, and the first interface.

Optionally, the second EVPN route is an Ethernet segment auto-discovery (ESAD) route, and the second identifier is carried in a prefix SID attribute field of the ESAD route.

Figure 9:
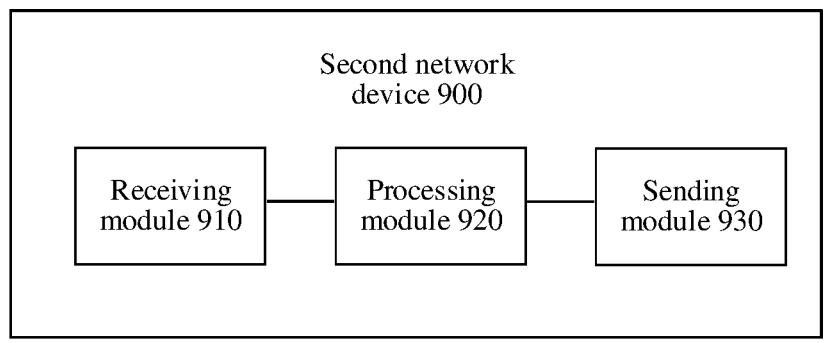
FIG. 9 is a schematic diagram of a structure of a second network device 900 according to an embodiment of the present disclosure.

FIG. 9 is a schematic diagram of a structure of a second network device 900 according to an embodiment of the present disclosure. The second network device 900 shown in FIG. 9 may perform corresponding steps performed by the second network device in the method in the foregoing embodiments. As shown in FIG. 9, the second network device 900 includes a receiving module 910, a processing module 920, and a sending module 930.

The receiving module 910 is configured to receive a broadcast, unknown unicast, and multicast BUM packet. The second network device is an ingress device in a BIER domain.

The processing module 920 is configured to obtain a BIERv6 packet based on the BUM packet. The BIERv6 packet includes an internet protocol version 6 (IPv6) header, a BIER header, and the BUM packet, a source address (SA) of the IPv6 header is a first IPv6 address, the first IPv6 address identifies the second network device, the BIER header includes a bit string bitstring, and the bit string indicates an egress device that is in the BIER domain and that receives the BUM packet.

The sending module 930 is configured to send the BIERv6 packet to a first network device based on the bit string. The first network device is an egress device in the BIER domain.

Optionally, the processing module 920 is further configured to determine the bit string based on whether to enable internet group management protocol/multicast listener discovery snooping (IGMP/MLD) Snooping.

Optionally, the second network device does not enable the IGMP/MLD Snooping, and the processing module 920 is specifically configured to: determine a first-type BUM member, and the first-type BUM member includes all egress devices in the BIER domain; and determine the bit string based on a bit forwarding router identifier BFR ID of each device in the first-type BUM member.

Optionally, the second network device enables the IGMP/MLD Snooping, and the processing module 920 is specifically configured to: determine the first-type BUM member, and the first-type BUM member includes all egress devices in the BIER domain; determine a first bit string based on the BFR ID of each device in the first-type BUM member, and the first bit string indicates an egress device that is in the BIER domain and that receives two types of packets: a broadcast B type packet and an unknown unicast U type packet; determine a second-type BUM member, the second-type BUM member includes an egress device that is in the BIER domain and that receives a multicast M type packet, and the egress device does not enable the IGMP/MLD Snooping, or the egress device enables the IGMP/MLD Snooping and has sent multicast information to the second network device; and determine a second bit string based on a BFR ID of each device in the second-type BUM member, and the second bit string indicates the egress device that is in the BIER domain and that receives the multicast M type packet.

Optionally, the first IPv6 address includes a first identifier. The first identifier identifies, on the second network device, an EVPN instance to which the BUM packet belongs.

Optionally, the first IPv6 address further includes a second identifier. The second identifier is an identifier allocated by the first network device to a first Ethernet segment (ES), and the first ES is a dual-homed ES of the first network device and the second network device.

Figure 10:
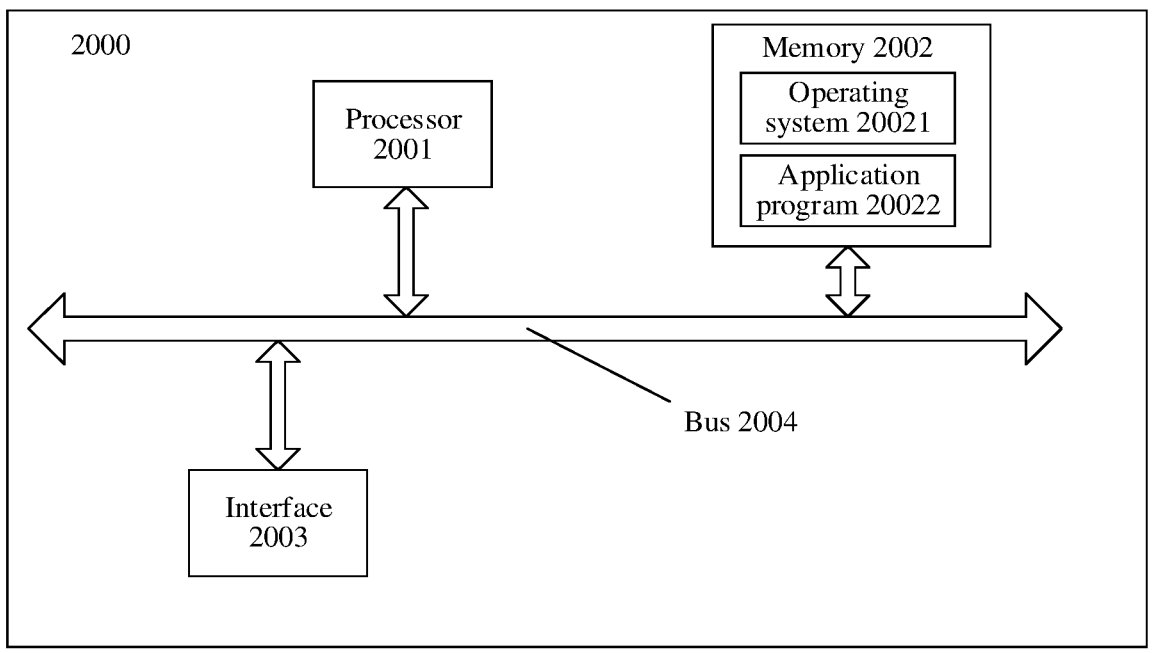
FIG. 10 is a schematic diagram of a hardware structure of another first network device 2000 according to an embodiment of the present disclosure.

FIG. 10 is a schematic diagram of a hardware structure of a first network device 2000 according to an embodiment of the present disclosure. The first network device 2000 shown in FIG. 10 may perform corresponding steps performed by the first network device in the method in the foregoing embodiments.

As shown in FIG. 10, the first network device 2000 includes a processor 2001, a memory 2002, an interface 2003, and a bus 2004. The interface 2003 may be implemented in a wireless or wired manner, and may be specifically a network adapter. The processor 2001, the memory 2002, and the interface 2003 are connected through the bus 2004.

The interface 2003 may specifically include a transmitter and a receiver, and is configured to enable the first network device to implement the foregoing receiving and sending.

The processor 2001 is configured to perform processing performed by the first network device in the foregoing embodiments. The memory 2002 includes an operating system 20021 and an application program 20022, and is configured to store a program, code, or instructions. When executing the program, the code, or the instructions, a processor or a hardware device may complete a processing process related to the first network device in the method embodiments. Optionally, the memory 2002 may include a read-only memory (ROM) and a random access memory (RAM). The ROM includes a basic input/output system (BIOS) or an embedded system, and the RAM includes an application program and an operating system. When the first network device 2000 needs to be run, a bootloader in the BIOS or the embedded system that is built into the ROM is used to boot a system to start, and boot the first network device 2000 to enter a normal running state. After entering the normal running state, the first network device 2000 runs the application program and the operating system in the RAM, to complete a processing process related to the first network device 2000 in the method embodiments.

It may be understood that FIG. 10 shows only a simplified design of the first network device 2000. The first network device may include any quantity of interfaces, processors, or memories in actual application.

Figure 11:
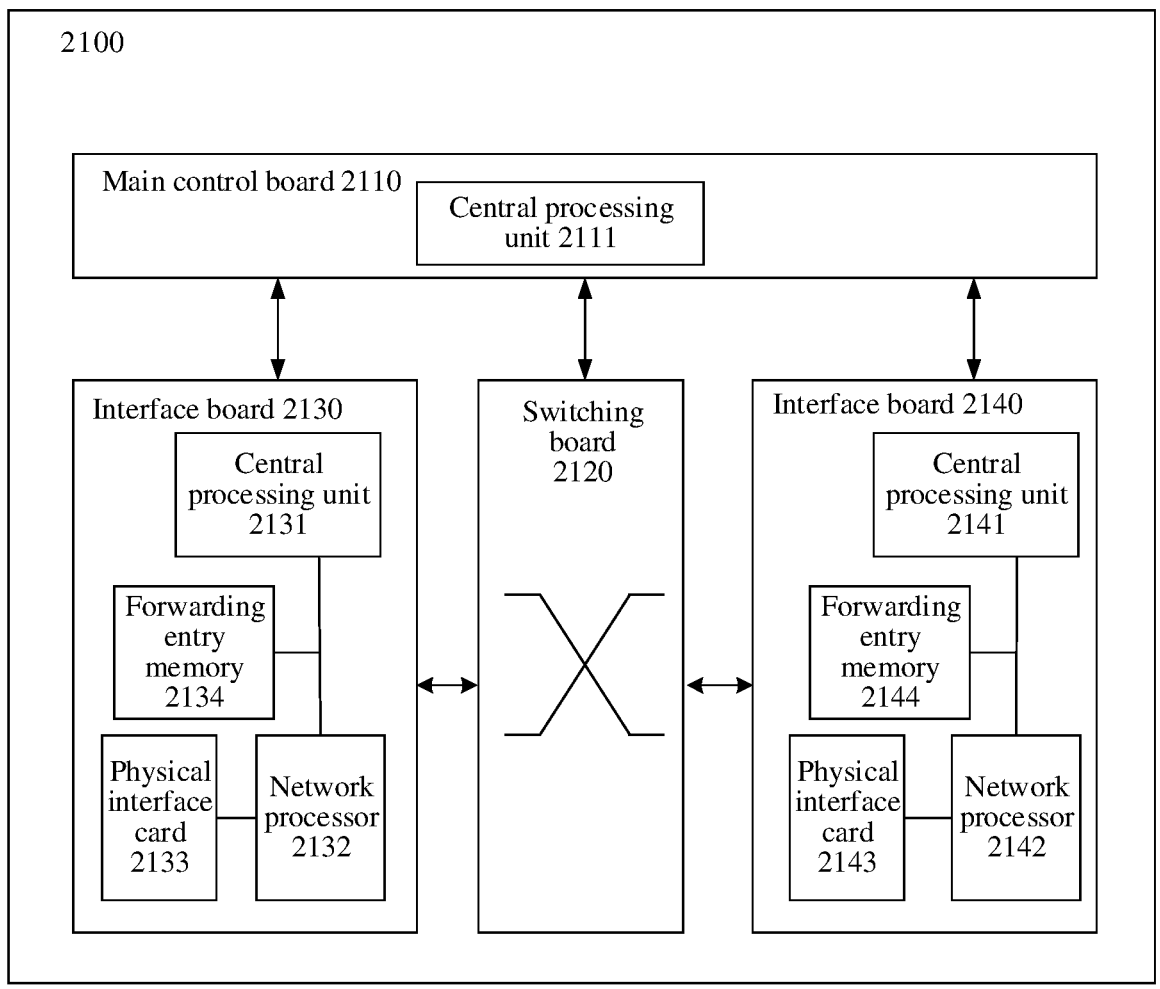
FIG. 11 is a schematic diagram of a hardware structure of another first network device 2100 according to an embodiment of the present disclosure.

FIG. 11 is a schematic diagram of a hardware structure of another first network device 2100 according to an embodiment of the present disclosure. The first network device 2100 shown in FIG. 11 may perform corresponding steps performed by the first network device in the method in the foregoing embodiments.

As shown in FIG. 11, the first network device 2100 includes a main control board 2110, an interface board 2130, a switching board 2120, and an interface board 2140. The main control board 2110, the interface board 2130, the interface board 2140, and the switching board 2120 are connected to a platform backboard through a system bus for interworking. The main control board 2110 is configured to complete functions such as system management, device maintenance, and protocol processing. The switching board 2120 is configured to complete data exchange between interface boards (the interface board is also referred to as a line card or a service board). The interface boards 2130 and 2140 are configured to: provide various service interfaces (such as a POS interface, a GE interface, and an ATM interface), and forward a data packet.

The interface board 2130 may include a central processing unit 2131, a forwarding entry memory 2134, a physical interface card 2133, and a network processor 2132. The central processing unit 2131 is configured to: control and manage the interface board, and communicate with a central processing unit on the main control board. The forwarding entry memory 2134 is configured to store an entry. The physical interface card 2133 is configured to receive and send traffic.

It should be understood that an operation on the interface board 2140 is consistent with an operation on the interface board 2130 in this embodiment of the present disclosure.

It should be understood that the first network device 2100 in this embodiment may correspond to the functions and/or the various implemented steps in the method embodiments.

In addition, it should be noted that there may be one or more main control boards. When there is a plurality of main control boards, an active main control board and a standby main control board may be included. There may be one or more interface boards. A first network device having a stronger data processing capability provides more interface boards. There may also be one or more physical interface cards on the interface board. There may be no switching board, or one or more switching boards. When there is a plurality of switching boards, load sharing and redundancy backup may be implemented together. In a centralized forwarding architecture, the first network device may need no switching board, and the interface board undertakes a service data processing function of an entire system. In a distributed forwarding architecture, the first network device may have at least one switching board, and exchange data between a plurality of interface boards by using the switching board, to provide a large-capacity data exchange and processing capability. Therefore, a data access and processing capability of the first network device in a distributed architecture is greater than that of a device in a centralized architecture. A specific architecture that is to be used depends on a specific networking deployment scenario. This is not limited herein.

Figure 12:
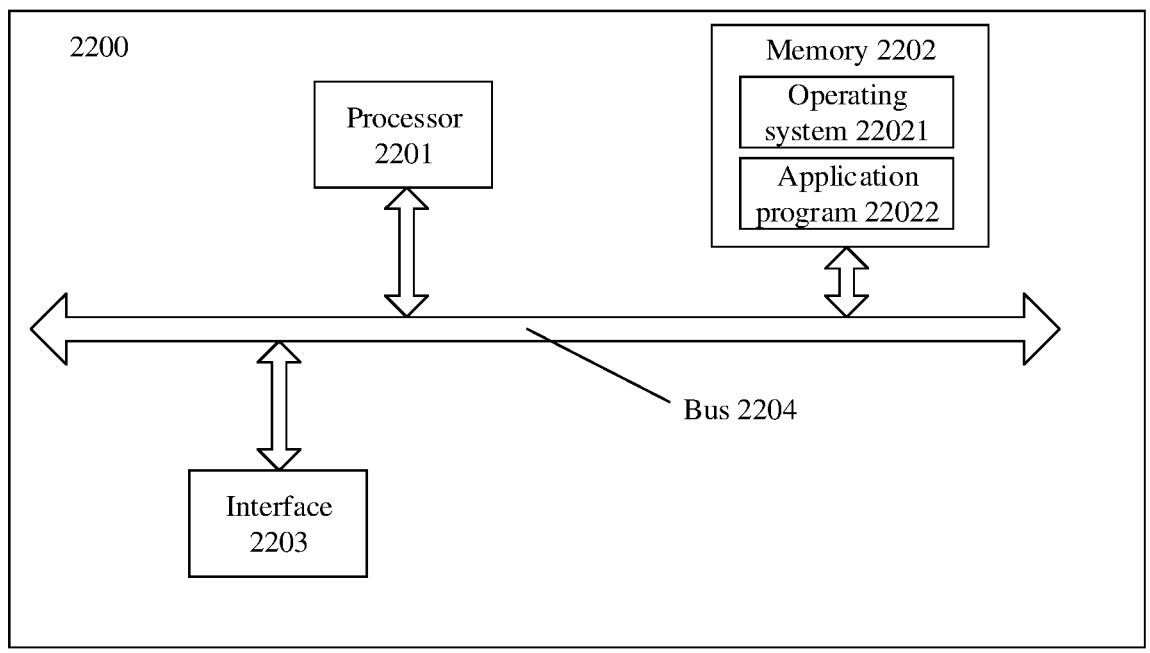
FIG. 12 is a schematic diagram of a hardware structure of another second network device according to an embodiment of the present disclosure.

FIG. 12 is a schematic diagram of a hardware structure of a second network device 2200 according to an embodiment of the present disclosure. The second network device 2200 shown in FIG. 12 may perform corresponding steps performed by the second network device in the method in the foregoing embodiments.

As shown in FIG. 12, the second network device 2200 includes a processor 2201, a memory 2202, an interface 2203, and a bus 2204. The interface 2203 may be implemented in a wireless or wired manner, and may be specifically a network adapter. The processor 2201, the memory 2202, and the interface 2203 are connected through the bus 2204.

The interface 2203 may specifically include a transmitter and a receiver. The processor 2201 is configured to perform processing performed by the second network device in the foregoing embodiments. The memory 2202 includes an operating system 22021 and an application program 22022, and is configured to store a program, code, or instructions. When executing the program, the code, or the instructions, a processor or a hardware device may complete a processing process related to the second network device in the method embodiments. Optionally, the memory 2202 may include a read-only memory (ROM) and a random access memory (RAM). The ROM includes a basic input/output system (BIOS) or an embedded system, and the RAM includes an application program and an operating system. When the second network device 2200 needs to be run, a bootloader in the BIOS or the embedded system that is built into the ROM is used to boot a system to start, and boot the second network device 2200 to enter a normal running state. After entering the normal running state, the second network device 2200 runs the application program and the operating system in the RAM, to complete a processing process related to the second network device 2200 in the method embodiments.

It may be understood that FIG. 12 shows only a simplified design of the second network device 2200. The second network device may include any quantity of interfaces, processors, or memories in actual application.

Figure 13:
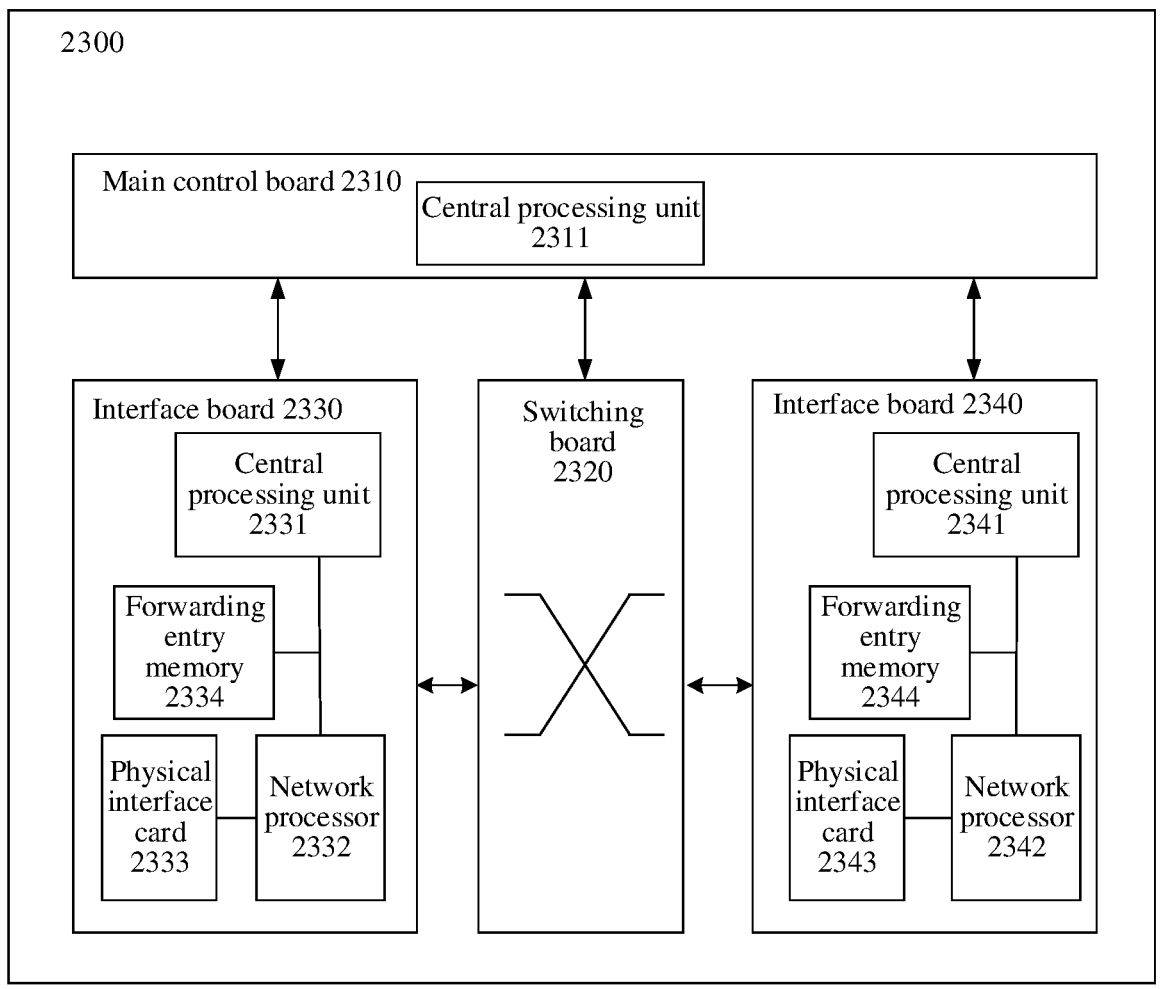
FIG. 13 is a schematic diagram of a hardware structure of another second network device according to an embodiment of the present disclosure.

FIG. 13 is a schematic diagram of a hardware structure of another second network device 2300 according to an embodiment of the present disclosure. The second network device 2300 shown in FIG. 13 may perform corresponding steps performed by the second network device in the method in the foregoing embodiments.

As shown in FIG. 13, the second network device 2300 includes a main control board 2310, an interface board 2330, a switching board 2320, and an interface board 2340. The main control board 2310, the interface board 2330, the interface board 2340, and the switching board 2320 are connected to a platform backboard through a system bus for interworking. The main control board 2310 is configured to complete functions such as system management, device maintenance, and protocol processing. The switching board 2320 is configured to complete data exchange between interface boards (the interface board is also referred to as a line card or a service board). The interface boards 2330 and 2340 are configured to: provide various service interfaces (such as a POS interface, a GE interface, and an ATM interface), and forward a data packet.

The interface board 2330 may include a central processing unit 2331, a forwarding entry memory 2334, a physical interface card 2333, and a network processor 2332. The central processing unit 2331 is configured to: control and manage the interface board, and communicate with a central processing unit on the main control board. The forwarding entry memory 2334 is configured to store an entry. The physical interface card 2133 is configured to receive and send traffic.

It should be understood that an operation on the interface board 2340 is consistent with an operation on the interface board 2330 in this embodiment. It should be understood that the second network device 2300 in this embodiment may correspond to the functions and/or the various implemented steps in the method embodiments.

In addition, it should be noted that, there may be one or more main control boards. When there is a plurality of main control boards, an active main control board and a standby main control board may be included. There may be one or more interface boards. A second network device having a stronger data processing capability provides more interface boards. There may also be one or more physical interface cards on the interface board. There may be no switching board, or one or more switching boards. When there is a plurality of switching boards, load sharing and redundancy backup may be implemented together. In a centralized forwarding architecture, the second network device may need no switching board, and the interface board undertakes a service data processing function of an entire system. In a distributed forwarding architecture, the second network device may have at least one switching board, and exchange data between a plurality of interface boards by using the switching board, to provide a large-capacity data exchange and processing capability. Therefore, a data access and processing capability of the second network device in a distributed architecture is greater than that of a device in a centralized architecture. A specific architecture that is to be used depends on a specific networking deployment scenario. This is not limited herein.

An embodiment of the present disclosure further provides a computer-readable medium. The computer-readable medium stores program code. When the computer program code is run on a computer, the computer is enabled to perform the method performed by the first network device. The computer-readable storage includes but is not limited to one or more of the following: a read-only memory (ROM), a programmable ROM (PROM), an erasable PROM (EPROM), a flash memory, an electrically EPROM (EEPROM), and a hard drive.

An embodiment of the present disclosure further provides a computer-readable medium. The computer-readable medium stores program code. When the computer program code is run on a computer, the computer is enabled to perform the method performed by the second network device. The computer-readable storage includes but is not limited to one or more of the following: a read-only memory (ROM), a programmable ROM (PROM), an erasable PROM (EPROM), a flash memory, an electrically EPROM (EEPROM), and a hard drive.

An embodiment of the present disclosure further provides a chip system. The chip system is applied to a first network device. The chip system includes at least one processor, at least one memory, and an interface circuit. The interface circuit is responsible for information exchange between the chip system and the outside. The at least one memory, the interface circuit, and the at least one processor are interconnected through a line. The at least one memory stores instructions, and the instructions are executed by the at least one processor, to perform operations of the first network device in the methods according to the foregoing aspects.

In a specific implementation process, the chip may be implemented in a form of a central processing unit (CPU), a micro controller unit (MCU), a micro processing unit (MPU), a digital signal processor (DSP), a system-on-a-chip (SoC), an application-specific integrated circuit (ASIC), a field programmable gate array (FPGA), or a programmable logic device (PLD).

An embodiment of the present disclosure further provides a chip system. The chip system is applied to a second network device. The chip system includes at least one processor, at least one memory, and an interface circuit. The interface circuit is responsible for information exchange between the chip system and the outside. The at least one memory, the interface circuit, and the at least one processor are interconnected through a line. The at least one memory stores instructions, and the instructions are executed by the at least one processor, to perform operations of the second network device in the methods according to the foregoing aspects.

In a specific implementation process, the chip may be implemented in a form of a central processing unit (CPU), a micro controller unit (MCU), a micro processing unit (MPU), a digital signal processor (DSP), a system-on-a-chip (SoC), an application-specific integrated circuit (ASIC), a field programmable gate array (FPGA), or a programmable logic device (PLD).

An embodiment of the present disclosure further provides a computer program product. The computer program product is applied to a first network device. The computer program product includes a series of instructions. When the instructions are run, operations of the first network device in the methods according to the foregoing aspects are performed.

An embodiment of the present disclosure further provides a computer program product. The computer program product is applied to a second network device. The computer program product includes a series of instructions. When the instructions are run, operations of the second network device in the methods according to the foregoing aspects are performed.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments.

In the several embodiments provided in the present disclosure, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments.

In addition, functional units in embodiments of the present disclosure may be integrated into one processing unit, each of the units may exist independently physically, or two or more units may be integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the current technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A bit index explicit replication over internet protocol version 6 (BIERv6) packet processing method, wherein the method is applied to an Ethernet virtual private network (EVPN), and the method comprises:
   receiving, by a first network device, a BIERv6 packet sent by a second network device, wherein the BIERv6 packet comprises an internet protocol version 6 (IPv6) header and a broadcast, unknown unicast, and multicast (BUM) packet, a source address (SA) of the IPV6 header is an IPV6 address, the IPV6 address identifies the second network device, the first network device is an egress device in a BIER domain, and the second network device is an ingress device in the BIER domain;
   determining, by the first network device based on the IPV6 address, an EVPN instance to which the BUM packet belongs; and
   forwarding, by the first network device, the BUM packet based on the determined EVPN instance.

2. The method according to claim 1, wherein the IPv6 address comprises a first identifier, and the first identifier identifies, on the second network device, that the BUM packet belongs to the determined EVPN instance.

3. The method according to claim 2, wherein the determining, by the first network device based on the IPV6 address, the determined EVPN instance to which the BUM packet belongs comprises:
   determining, by the first network device, the determined EVPN instance based on a prefix of the IPV6 address, the first identifier, and a first correspondence, wherein the first correspondence is a correspondence between the prefix of the IPV6 address, the first identifier, and the determined EVPN instance.

4. The method according to claim 3, wherein before the receiving, by the first network device, the BIERv6 packet sent by the second network device, the method further comprises:
   receiving, by the first network device, a first EVPN route sent by the second network device, wherein the first EVPN route carries the prefix of the IPV6 address and the first identifier; and
   establishing, by the first network device, the first correspondence based on the received first EVPN route.

5. The method according to claim 4, wherein the received first EVPN route is an inclusive multicast Ethernet tag (IMET) route, and the prefix of the IPV6 address and the first identifier are carried in a multicast service identifier (MSID) attribute field or a prefix segment identifier prefix (SID) attribute field of the IMET route.

6. The method according to claim 2, wherein the IPv6 address further comprises a second identifier, the second identifier is an identifier allocated by the first network device to a first Ethernet segment (ES), and the first ES is a dual-homed ES of the first network device and the second network device.

7. The method according to claim 6, further comprising:
determining, by the first network device, a first interface based on a prefix of the IPv6 address, the second identifier, and a second correspondence, wherein the second correspondence is a correspondence between the prefix of the IPV6 address, the second identifier, and the first interface, and the first interface is an interface corresponding to the first ES on the first network device; and
the forwarding, by the first network device, the BUM packet based on the determined EVPN instance comprises:
forwarding, by the first network device, the BUM packet to an interface other than the first interface in interfaces corresponding to the determined EVPN instance.

8. The method according to claim 7, wherein before the receiving, by the first network device, the BIERv6 packet sent by the second network device, the method further comprises:
receiving, by the first network device, a second EVPN route sent by the second network device, wherein the second EVPN route carries the second identifier; and
establishing, by the first network device, the second correspondence based on the second identifier, the prefix of the IPV6 address, and the first interface.

9. The method according to claim 8, wherein the received second EVPN route is an Ethernet segment auto-discovery (ESAD) route, and the second identifier is carried in a prefix SID attribute field of the ESAD route.

10. The first network device, wherein the first network device is applied to an Ethernet virtual private network (EVPN), and comprises:
a memory storing instructions that, when executed by a processor coupled to the memory, cause the first network device to perform operations comprising:
receiving a bit index explicit replication over internet protocol version 6 (BIERv6) packet sent by a second network device, wherein the BIERv6 packet comprises an internet protocol version 6 (IPv6) header and a broadcast, unknown unicast, and multicast (BUM) packet, a source address (SA) of the IPV6 header is an IPV6 address, the IPV6 address identifies the second network device, the first network device is an egress device in a BIER domain, and the second network device is an ingress device in the BIER domain;
determining, based on the IPV6 address, an EVPN instance to which the BUM packet belongs; and
forwarding the BUM packet based on the determined EVPN instance.

11. The first network device according to claim 10, wherein the IPV6 address comprises a first identifier, and the first identifier identifies, on the second network device, that the BUM packet belongs to the determined EVPN instance.

12. The first network device according to claim 11, wherein the operations further comprise:
determining the EVPN instance based on a prefix of the IPV6 address, the first identifier, and a first correspondence, wherein the first correspondence is a correspondence between the prefix of the IPV6 address, the first identifier, and the determined EVPN instance.

13. The first network device according to claim 12, wherein the operations further comprise:
receiving a first EVPN route sent by the second network device, wherein the received first EVPN route carries the prefix of the IPV6 address and the first identifier; and
establishing the first correspondence based on the first EVPN route.

14. The first network device according to claim 13, wherein the received first EVPN route is an inclusive multicast Ethernet tag (IMET) route, and the prefix of the IPV6 address and the first identifier are carried in a multicast service identifier (MSID) attribute field or a prefix segment identifier prefix (SID) attribute field of the IMET route.

15. The first network device according to claim 11, wherein the IPv6 address further comprises a second identifier, the second identifier is an identifier allocated by the first network device to a first Ethernet segment (ES), and the first ES is a dual-homed ES of the first network device and the second network device.

16. The first network device according to claim 15, wherein the operations further comprise:
determining a first interface based on a prefix of the IPV6 address, the second identifier, and a second correspondence, wherein the second correspondence is a correspondence between the prefix of the IPV6 address, the second identifier, and the first interface, and the first interface is an interface corresponding to the first ES on the first network device; and
forwarding the BUM packet to an interface other than the first interface in interfaces corresponding to the determined EVPN instance.

17. The first network device according to claim 16, wherein the operations further comprise:
receiving a second EVPN route sent by the second network device, wherein the second EVPN route carries the second identifier; and
establishing the second correspondence based on the second identifier, the prefix of the IPv6 address, and the first interface.

18. The first network device according to claim 17, wherein the received second EVPN route is an Ethernet segment auto-discovery (ESAD) route, and the second identifier is carried in a prefix SID attribute field of the ESAD route.

* * * * *

UNITED STATES PATENT AND TRADEMARK OFFICE
CERTIFICATE OF CORRECTION

PATENT NO. : 12,199,862 B2
APPLICATION NO. : 18/476354
DATED : January 14, 2025
INVENTOR(S) : Fanghong Duan et al.

It is certified that error appears in the above-identified patent and that said Letters Patent is hereby corrected as shown below:

In the Specification

Column 26, Line 8, change "ADA of the Ipv6" to --A DA of the Ipv6--;

Column 23, Line 4, change "ADA of the Ipv6" to --A DA of the Ipv6--;

In the Claims

Column 36, Claim 1, Line 31, change "IPV6" to --IPv6--;

Column 36, Claim 1, Line 38, change "IPV6" to --IPv6--, both instances;

Column 36, Claim 1, Line 32, change "IPV6" to --IPv6--;

Column 36, Claim 2, Line 42, change "IPV6" to --IPv6--;

Column 36, Claim 3, Line 47, change "IPV6" to --IPv6--;

Column 36, Claim 3, Line 51, change "IPV6" to --IPv6--;

Column 36, Claim 3, Line 54, change "IPV6" to --IPv6--;

Column 36, Claim 4, Line 62, change "IPV6" to --IPv6--;

Column 37, Claim 5, Line 1, change "IPV6" to --IPv6--;

Column 37, Claim 7, Line 16, change "IPV6" to --IPv6--;

Column 37, Claim 8, Line 35, change "IPV6" to --IPv6--;

Signed and Sealed this
Twenty-fifth Day of February, 2025

Coke Morgan Stewart
*Acting Director of the United States Patent and Trademark Office*

CERTIFICATE OF CORRECTION (continued)
U.S. Pat. No. 12,199,862 B2

Column 37, Claim 10, Line 40, change "The first network" to --A first network--;

Column 37, Claim 10, Line 51, change "(SA) of the IPV6" to --(SA) of the IPv6--;

Column 37, Claim 10, Line 52, change "IPV6 address" to --IPv6 address--;

Column 37, Claim 10, Line 52, change "the IPV6" to --the IPv6--;

Column 37, Claim 10, Line 56, change "IPV6" to --IPv6--;

Column 38, Claim 11, Line 2, change "IPV6" to --IPv6--;

Column 38, Claim 12, Line 8, change "IPV6" to --IPv6--;

Column 38, Claim 12, Line 10, change "IPV6" to --IPv6--;

Column 38, Claim 13, Line 5, change "IPV6" to --IPv6--;

Column 38, Claim 14, Line 24, change "IPV6" to --IPv6--;

Column 38, Claim 16, Line 36, change "IPV6" to --IPv6--; and

Column 38, Claim 16, Line 39, change "IPV6" to --IPv6--.